(12) United States Patent
Pelouch et al.

(10) Patent No.: US 8,111,453 B2
(45) Date of Patent: Feb. 7, 2012

(54) SUBMARINE OPTICAL REPEATER

(75) Inventors: Wayne S. Pelouch, McKinney, TX (US); Do-Il Chang, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 542 days.

(21) Appl. No.: 12/371,489

(22) Filed: Feb. 13, 2009

(65) Prior Publication Data

US 2010/0209110 A1    Aug. 19, 2010

(51) Int. Cl.
H01S 3/00    (2006.01)
(52) U.S. Cl. ......................... 359/334; 398/157
(58) Field of Classification Search ............... 359/341.3, 359/341.2, 334; 398/157
See application file for complete search history.

(56) References Cited

U.S. PATENT DOCUMENTS

| | | | | |
|---|---|---|---|---|
| 5,323,404 A * | 6/1994 | Grubb | | 372/6 |
| 5,815,518 A * | 9/1998 | Reed et al. | | 372/6 |
| 5,883,735 A | 3/1999 | Sugiyama et al. | | |
| 6,556,325 B1 | 4/2003 | Horiuchi et al. | | |
| 6,711,359 B1 | 3/2004 | Duff et al. | | |
| 6,970,650 B2 * | 11/2005 | Kajiya et al. | | 398/92 |
| 7,522,842 B1 * | 4/2009 | McNicol et al. | | 398/157 |
| 2003/0133179 A1 | 7/2003 | Islam et al. | | |
| 2003/0189750 A1 | 10/2003 | Islam et al. | | |
| 2004/0109655 A1 * | 6/2004 | Dennis et al. | | 385/123 |
| 2005/0025501 A1 * | 2/2005 | Bickham | | 398/188 |
| 2005/0226622 A1 | 10/2005 | Trischitta et al. | | |
| 2007/0229939 A1 | 10/2007 | Brown et al. | | |
| 2008/0037109 A1 | 2/2008 | Rapp | | |
| 2008/0074731 A1 | 3/2008 | Takeyama | | |

OTHER PUBLICATIONS

Inline Pump Sharing Architecture for Remotely-Pumped Pre- and Post-Amplifiers (3 pages) S.B. Papernyi—MPB Communications Inc, 147 Hymus Blvd, Pointe Claire, Quebec, H9R 1E9, Canada.
A Long-Span Repeater For Regional Submarine Systems (4 pages) Patrice Le Roux, Melanie Jaouen and Ghislaine Vareille Alcatel-Lucent, Centre de Villarceaux—91620 Nozay Cedex, France.
Ultra-Long Haul Fiber Transmission Technologies and Techniques (3 pages) Morten Nissov—Tyco Telecommunications, 250 Industrial Way West, Eatontown NJ 07724, USA OFC/NFOEC 2008.
Advanced Repeater Architectures with Ultra-Long Spans for Submarine Systems (3 pages) A. Lucero, D.G. Foursa, C.R. Davidson, M. Nissov, D. Kovsh, and A.N. Pilipetskii Tyco Telecommunications, 250 Industrial Way West, Eatontown NJ 07724, USA OFC/NFOEC 2008.
Upgrading WDM Submarine Systems to 40-Gbit/s Channel Bitrate Grabriel Charlet, Member IEEE, and Sebastien Bigo, Member IEEE vol. 94, No. 5, May 2006 / Proceedings of the IEEE 2006.
PCT/US2010/024162, Notification of Transmittal of the International Search Report and the Written Opinion of the International Searching Authority, or Declaration dated Apr. 14, 2010. (7 pages).

* cited by examiner

*Primary Examiner* — Mark Hellner
(74) *Attorney, Agent, or Firm* — James Harlan

(57) ABSTRACT

A submarine optical repeater that shares optical pump power in multiple gain stages such that approximately the same wavelengths of optical pump is provided to each of the gain stages. Also, tilt control mechanism may adjust gain dependency on wavelength by adjusting the amount of optical pump power delivered to the optical gain stages. Residual optical pump power from both forward and backward Raman amplification may be used to power corresponding optically pumped amplifiers.

23 Claims, 14 Drawing Sheets

SUBMARINE OPTICAL REPEATER

BACKGROUND

Fiber-optic communication networks serve a key demand of the information age by providing high-speed data between network nodes. Fiber optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Transmission of optic signals over such long distances presents enormous technical challenges. Significant time and resources may be required for any improvement in the art of long-haul and ultra-long-haul optical communication. Each improvement can represent a significant advance since such improvements often lead to the more widespread availability of communication throughout the globe. Thus, such advances may potentially accelerate humankind's ability to collaborate, learn, do business, and the like, regardless of where an individual resides on the globe. Indeed, long-haul and ultra-long-haul fiber optic technology provides the communication infrastructure backbone upon which the global economy may more easily thrive.

One of the many challenges that developers of long-haul optic links face involves reliability. The long reach and large carrying capacity of long-haul fiber optic links makes such links heavily relied upon as a functioning component of the Internet, or as a vehicle for communicating voice information. A competing challenge is electrical power consumption. In long-haul optic links, power may not be necessarily available at points in the link (such as repeaters) that might require electrical power. This is especially true in the case of a submarine repeater that is situated on an ocean floor. Accordingly, power is often delivered to such points using an electrical conductor that is integrated with, or is associated with the optical cable. Since large distances are involved, much of the electrical power is lost as heat throughout the length of the electrical conductor.

In addition, the spacing of repeaters in a submarine link affects the optical quality of the transmitted signals, the electrical power consumption, and the cost of the link. In general, an increase in repeater spacing decreases the electrical power consumption and the link cost which is desirable, but also decreases the signal quality which is undesirable. Accordingly, repeater designs which improve the signal quality at greater repeater spacing and improve the electrical efficiency provide significant improvements to the art of long-haul and ultra-long-haul optics technology.

Prior approaches have increased the repeater spacing by using a discrete Erbium-doped fiber amplifier (EDFA) within the repeater in combination with 1) distributed backward Raman amplification, 2) distributed backward Raman amplification which additionally pumps a remote discrete EDFA, or 3) a remote discrete EDFA without Raman amplification.

BRIEF SUMMARY

Embodiments described herein related to a submarine optical link that includes both forward and backward optically pumped amplifiers (e.g., a remote optically pumped amplifier). The forward optically pumped amplifier is powered by residual optical pump power from the forward Raman amplification. Meanwhile, the backward optically pumped amplifier is powered by residual optical pump power from the backward Raman amplification. In one embodiment, the forward and backward optically pumped amplifiers are the same. The use of both forward and backward Raman amplification with forward and backward optically pumped amplifiers permits longer optical link spans and/or better optical signal quality in some embodiments. In a bi-directional communication link, further efficiencies may be gained by sharing residual optical pump power from one direction in the bi-directional link with the opposite direction in the bi-directional link.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a submarine optical repeater may share optical pump power in multiple gain stages such that approximately the same wavelengths of optical pump power is provided to each of the gain stages. A tilt control mechanism may adjust gain dependency on wavelength by adjusting the amount of optical pump power delivered to the optical gain stages. In one embodiment, residual optical pump power from both forward and backward Raman amplification may be used to power corresponding optically pumped amplifiers (e.g., remote optically pumped amplifiers).

Figure 1:
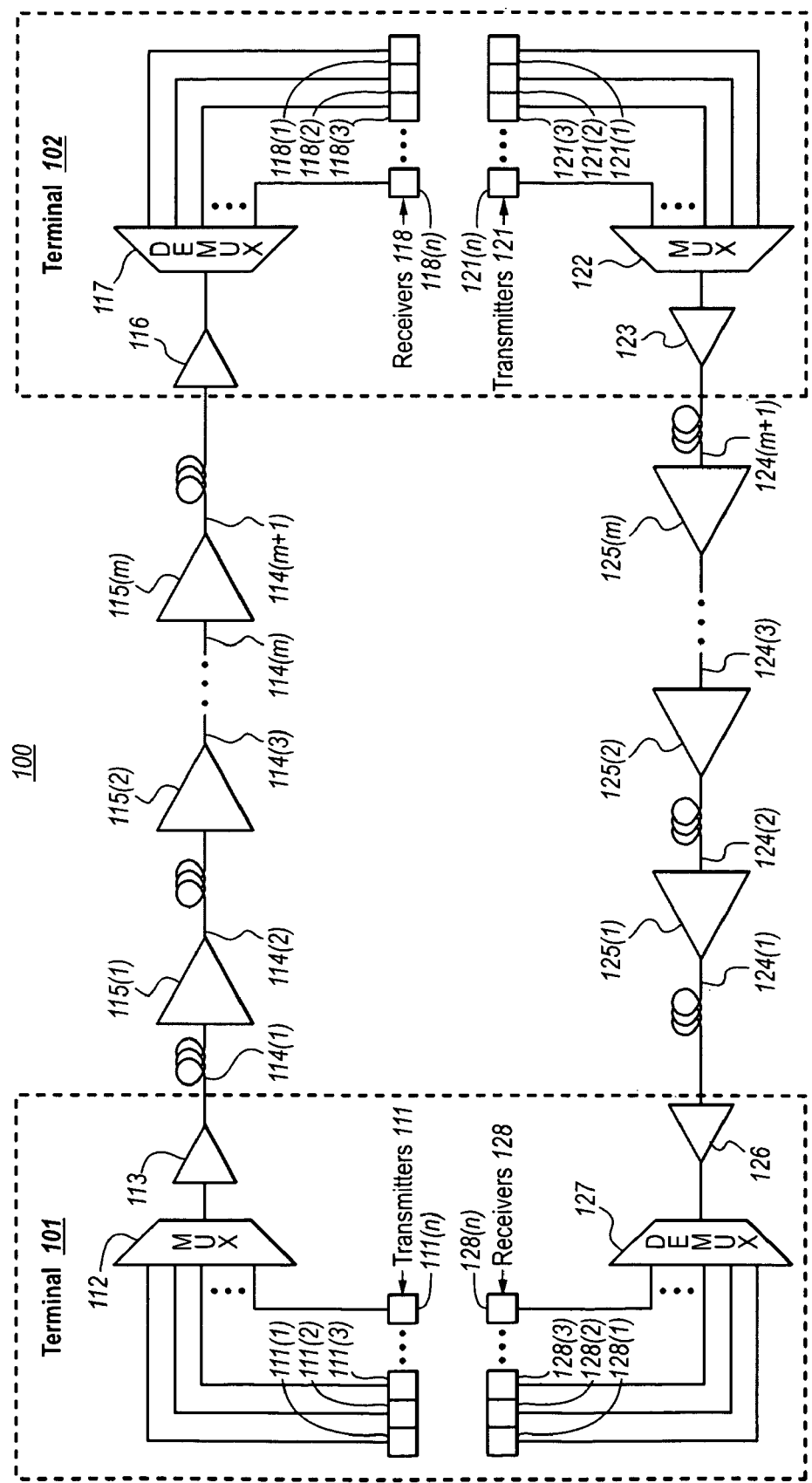
FIG. 1 schematically illustrates an example optical communications network including two optically communicating terminals.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "wavelength division optical channels". Each wavelength division optical channel is allocated a particular frequency for optical communication. Accordingly, in order to communicate using WDM or DWDM optical signals, the terminal 101 may have "n" optical transmitters 111 (including optical transmitters 111(1) through 111($n$), where n is a positive integer), each optical transmitter for transmitting over a corresponding eastern wavelength division optical channel. Likewise, the terminal 102 may have "n" optical transmitters 121 including optical transmitters 121(1) through 121($n$), each also for transmitting over a corresponding western wavelength division optical channel. The principles described herein are not limited, however, to communications in which the number of eastern wavelength division optical channels is the same as the number of western wavelength division optical channels. Furthermore, the principles described herein are not limited to the precise structure of the each of the optical transmitters. However, lasers are an appropriate optical transmitter for transmitting at a particular frequency. That said, the optical transmitters may each even be multiple laser transmitters, and may be tunable within a frequency range.

As for the eastern channel for optical transmission in the eastern direction, the terminal 101 multiplexes each of the eastern optical signals from the optical transmitters 111 into a single eastern optical signal using optical multiplexer 112, which may then be optically amplified by an optional eastern optical amplifier 113 prior to being transmitted onto a first fiber link 114(1).

There are a total of "m" repeaters 115 and "m+1" optical fiber links 114 between the terminals 101 and 102 in each of the eastern and western channels. However, there is no requirement for the number of repeaters in each of the eastern and western channels to be equal. In an unrepeatered optical communication system, "m" would be zero such that there is but a single fiber link 114(1) and no repeaters between the terminals 101 and 102. In a repeatered optical communication system, "m" would be one or greater. Each of the repeaters, if present, may consume electrical power to thereby amplify the optical signals.

The eastern optical signal from the final optical fiber link 114($m$+1) is then optionally amplified at the terminal 102 by the optional optical amplifier 116. The eastern optical signal is then demultiplexed into the various wavelength division optical channels using optical demultiplexer 117. The various wavelength division optical channels may then be received and processed by corresponding optical receivers 118 including receivers 118(1) through 118($n$).

As for the western channel for optical transmission in the western direction, the terminal 102 multiplexes each of the western optical signals from the optical transmitters 121 (including optical transmitters 121(1) through 121($n$)) into a single western optical signal using the optical multiplexer 122. The multiplexed optical signal may then be optically amplified by an optional western optical amplifier 123 prior to being transmitted onto a first fiber link 124($m$+1). If the western optical channel is symmetric with the eastern optical channel, there are once again "m" repeaters 125 (labeled 125(1) through 125($m$)), and "m+1" optical fiber links 124 (labeled 124(1) through 124($m$+1)). Recall that in an unrepeatered environment, "m" may be zero such that there is only one optical fiber link 124(1) and no repeaters 125 in the western channel.

The western optical signal from the final optical fiber link 124(1) is then optionally amplified at the terminal 101 by the optional optical amplifier 126. The western optical signal is then demultiplexed using optical demultiplexer 127, whereupon the individual wavelength division optical channels are received and processed by the receivers 128 (including receivers 128(1) through 128($n$)). Terminals 101 and/or 102 do not require all the elements shown in optical communication system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeatered system) for high-quality single mode fiber might be about 50 kilometers, and in practice may range from 30 kilometers or less to 90 kilometers or more. That said, the principles described herein are not limited to any particular optical path distances between repeaters, nor are they limited to repeater systems in which the optical path distances are the same from one repeatered segment to the next.

The optical communications system 100 is represented in simplified form for purpose of illustration and example only. The principles described herein may extend to much more complex optical communications systems. The principles described herein may apply to optical communications in which there are multiple fiber pairs, each for communicating multiplexed WDM optical signals. Furthermore, the principles described herein also apply to optical communications in which there are one or more branching nodes that split one or more fiber pairs and/or wavelength division optical channels in one direction, and one or more fiber pairs and/or wavelength division optical channels in another direction.

Figure 2:
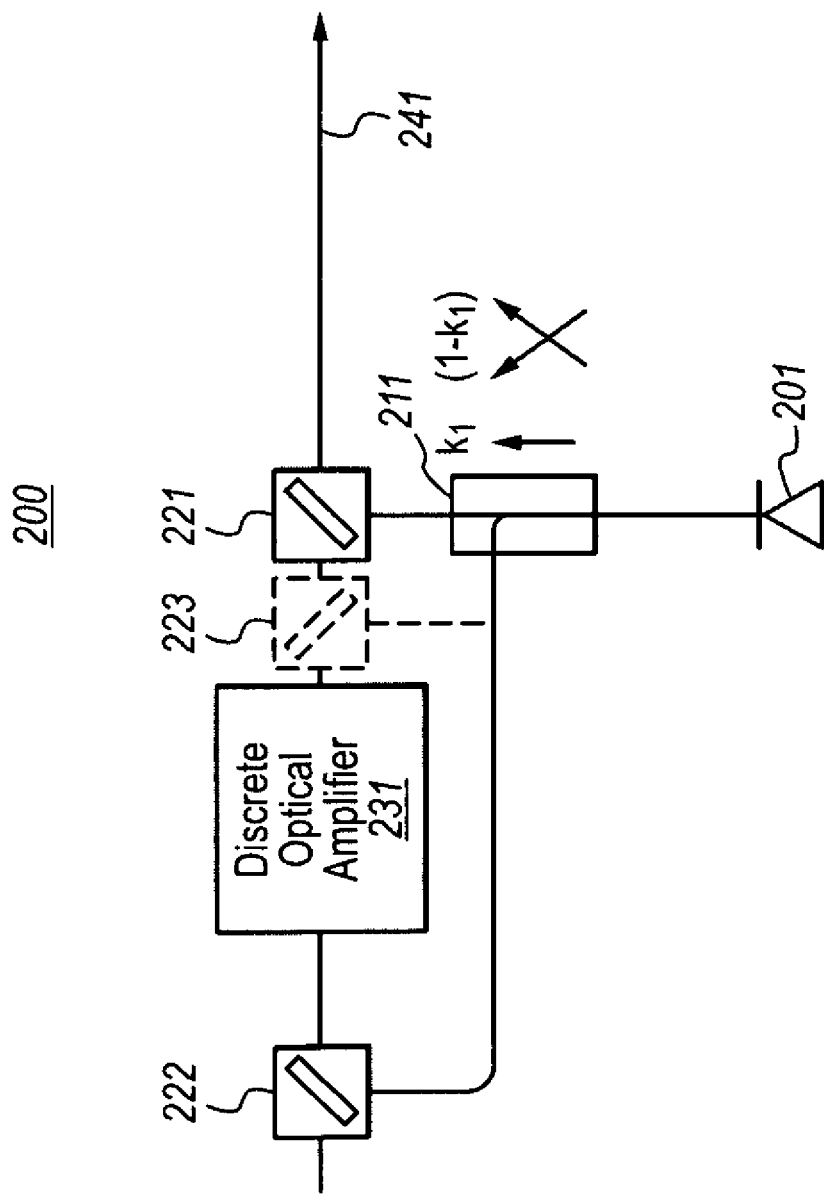
FIG. 2 schematically illustrates an optical apparatus such as a repeater or a terminal for use in an optical communications system such as that of FIG. 1.
Figure 3:
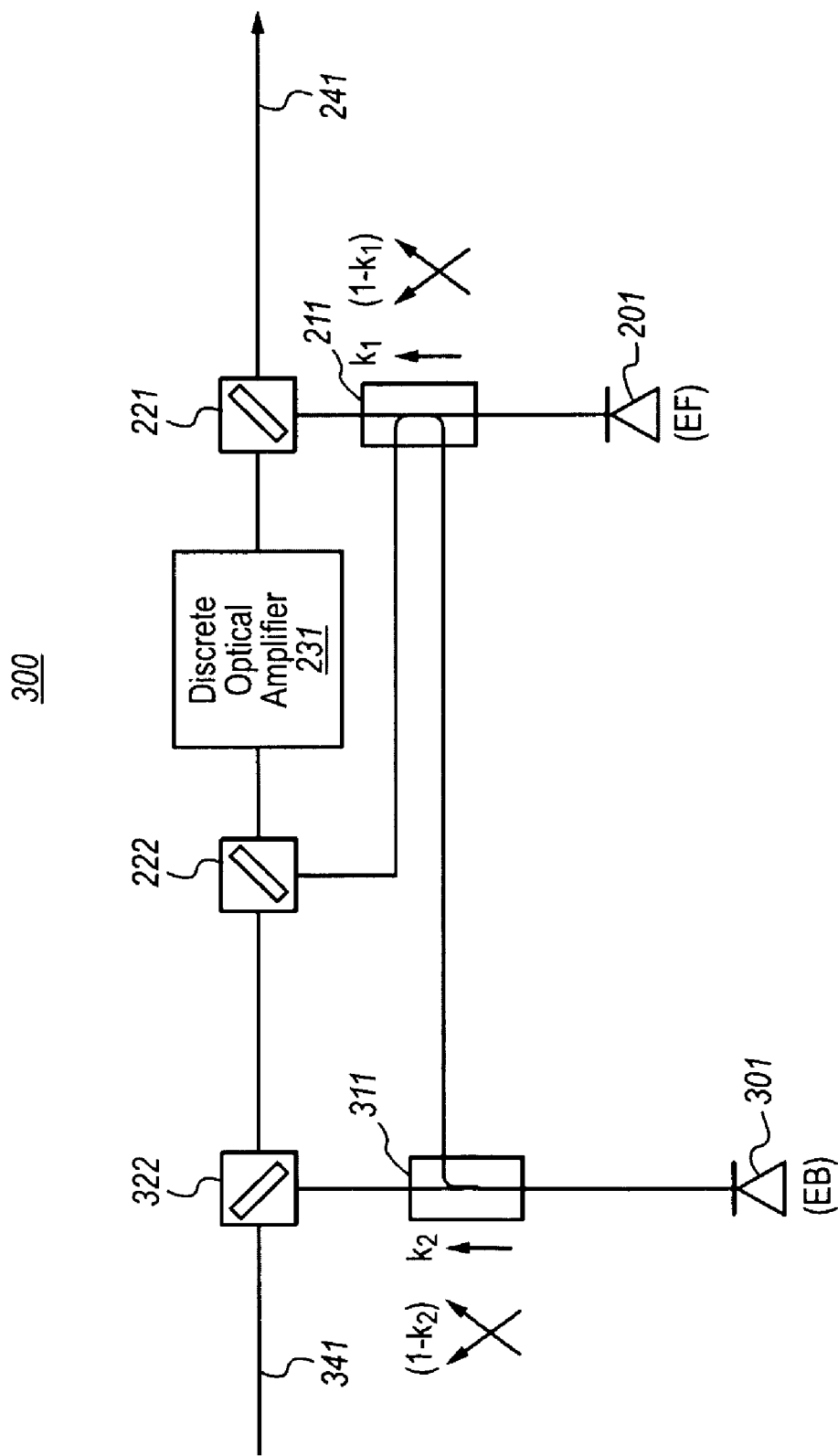
FIG. 3 schematically illustrates an optical apparatus such as that of FIG. 2, except with an additional pump unit for use with additional Raman amplification.
Figure 4:
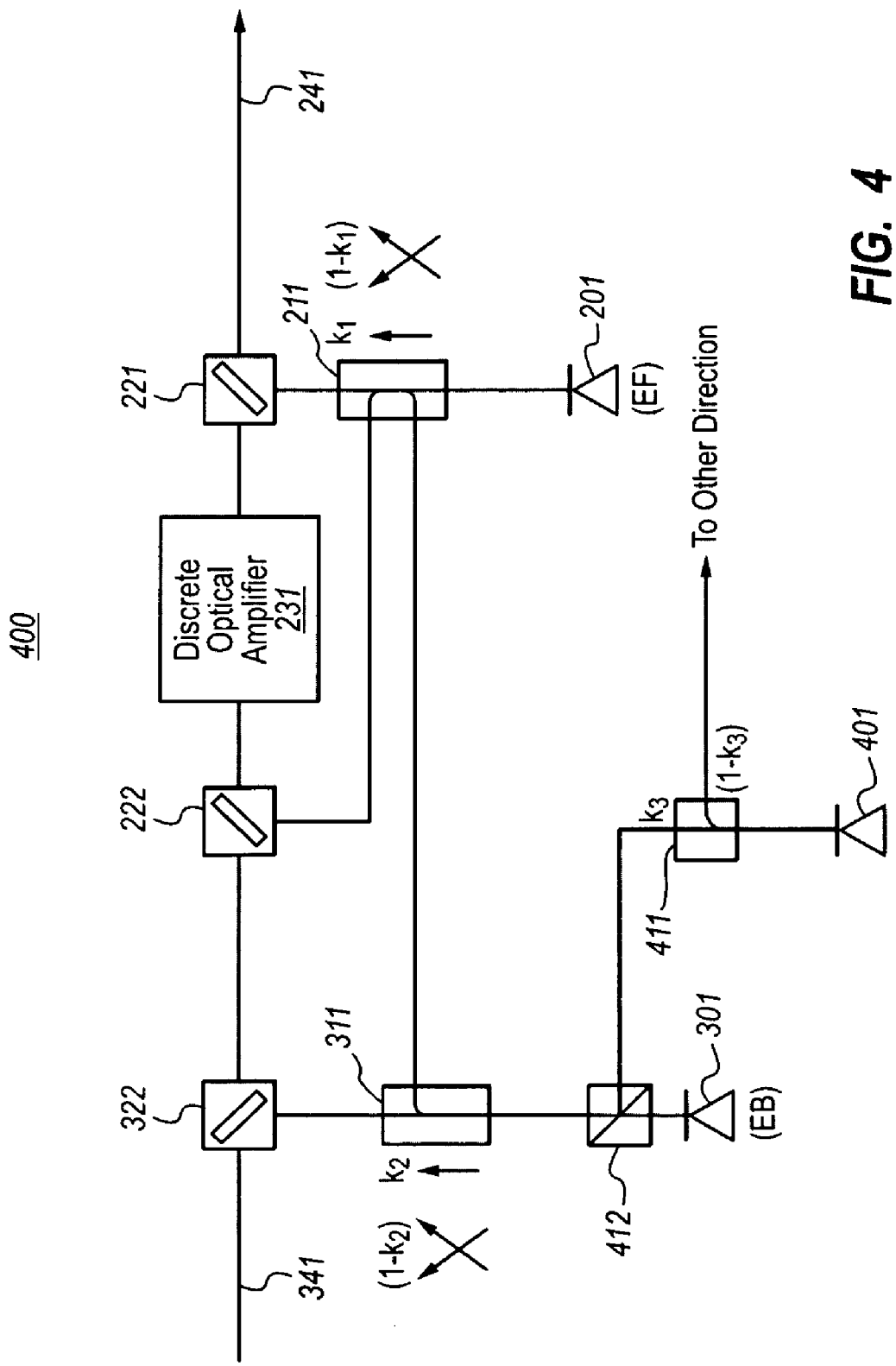
FIG. 4 schematically illustrates an optical apparatus of FIG. 3, except with an additional pump unit that supplements or provide redundancy to the optical pump power provided by the second optical pump unit of FIG. 3.
Figure 5:
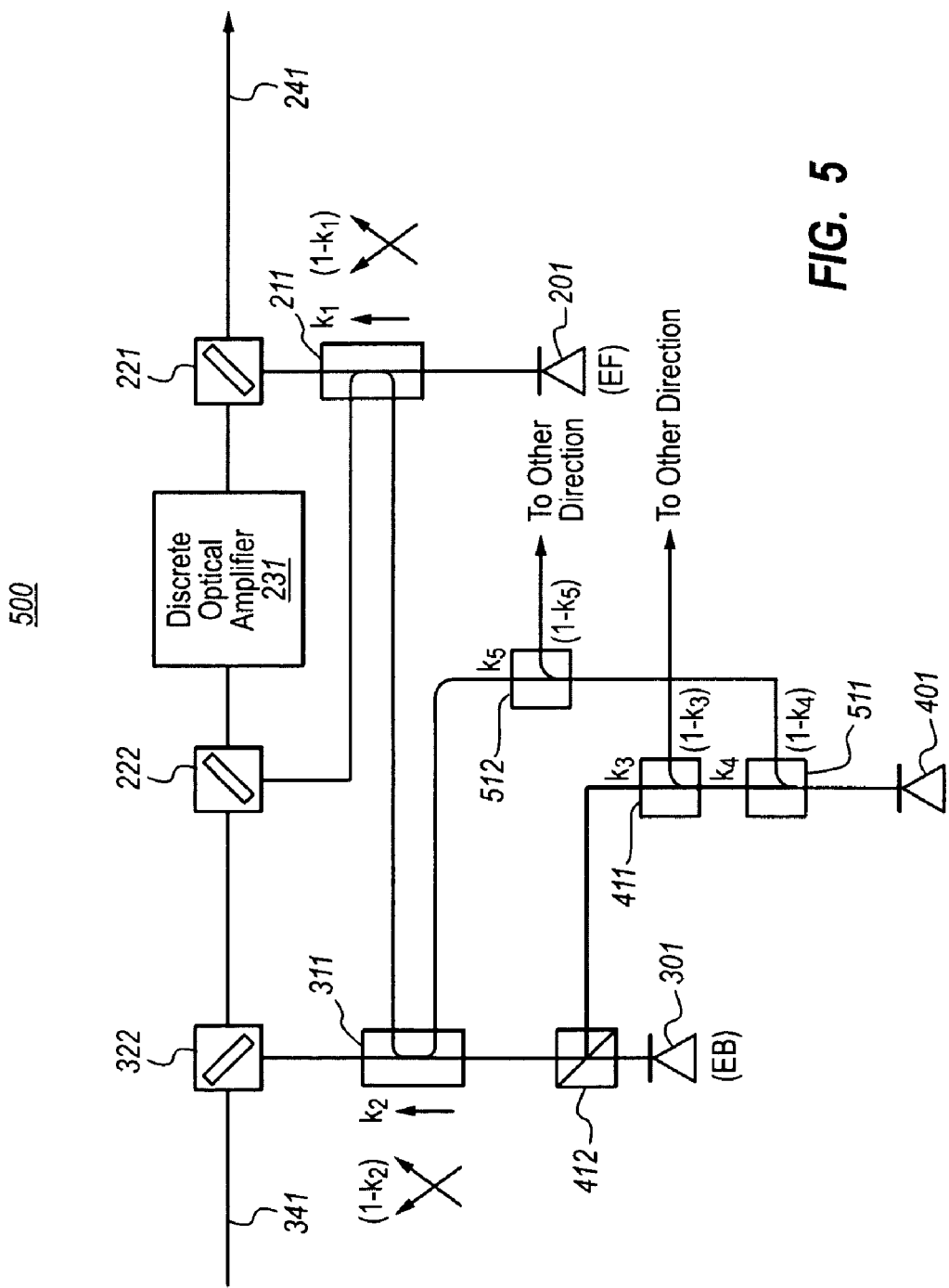
FIG. 5 schematically illustrates an optical apparatus of FIG. 4, except with additional optical power distribution components that provide additional shared paths from the third optical pump unit of FIG. 4.

FIG. 2 illustrates an optical apparatus 200 that may be used in an optical communications system such as the optical communications system 100 of FIG. 1. FIGS. 3 through 5 illustrated optical apparatuses 300, 400 and 500, which in that order added successive components. FIGS. 2 through 5 will now be described in that order.

In one embodiment, one or more or potentially all of the eastern repeaters 115 and the western repeaters 125 may be submarine repeaters. Submarine repeaters are designed for operation under the surface of the ocean. If used in the optical communications system 100 of FIG. 1, the optical apparatus 200 (or any of apparatuses 300, 400 or 500) may be integrated with one of the eastern repeaters 115 or one of the western repeaters 125. Furthermore, the optical apparatus 200 (or any of the apparatuses 300, 400 or 500) may be integrated within a submarine repeater. The optical apparatus 200 (or any of the apparatuses 300, 400 or 500) may also be integrated with one of the terminals 101 and 102, regardless of whether the optical communications system 100 is a repeatered optical system or an unrepeatered optical system. The optical signal may be in an eastern optical signal, or a western optical signal, and may be traveling from left to right or from right to left in FIG. 2. FIGS. 2, 3, 4, and 5 may include additional components not shown in the figures that may, for example, provide optical isolation or, for example, provide optical depolarization.

For example, if the optical apparatus 200 is incorporated into terminal 101 of FIG. 1, the discrete amplifier 231 might be the discrete amplifier 113 of FIG. 1 and the optical fiber span 241 may be the optical fiber span 114(1) of FIG. 1. In that case, the optical signal would be an eastern optical signal traveling from left to right in FIG. 2, and the portion $k_1$ of the optical pump power would be used to perform forward Raman amplification of the eastern optical signal. Alternatively, the discrete amplifier 231 might be the discrete amplifier 126 of FIG. 1 and the optical fiber span 241 may be the optical fiber span 124(1) of FIG. 1. In that case, the optical signal would be a western optical signal traveling from right to left in FIG. 2, and the portion $k_1$ of the optical pump power would be used to perform backward Raman amplification of the western optical signal.

On the other hand, if the optical apparatus 200 is incorporated into terminal 102 of FIG. 1, the discrete amplifier 231 might be the discrete amplifier 116 of FIG. 1 and the optical fiber span 241 may be the optical fiber span 114($m$+1) of FIG. 1. In that case, the optical signal would be an eastern optical signal traveling from right to left in FIG. 2 (which means that the optical apparatus 200 would be horizontally flipped in order to fit into the terminal 102 as shown in FIG. 1). In addition, the portion $k_1$ of the optical pump power would be used to perform backward Raman amplification of the eastern optical signal. Alternatively, the discrete amplifier 231 might be the discrete amplifier 123 of FIG. 1 and the optical fiber span 241 may be the optical fiber span 124($m$+1) of FIG. 1. In that case, the optical signal would be a western optical signal traveling from left to right in FIG. 2 (which once again means that the optical apparatus 200 would be horizontally flipped in order to fit into the terminal 102 as shown in FIG. 1). In addition, the portion $k_1$ of the optical pump power would be used to perform forward Raman amplification of the western optical signal.

In addition, the optical apparatus 200 may be incorporated into any one of the eastern repeaters 115($k$), where k is equal to any integer from 1 to m. In that case, the eastern optical signal could be traveling from left to right in FIG. 2, in which case optical fiber span 241 would be optical fiber span 114($k$+1) of FIG. 1, and the portion $k_1$ of the optical pump power would be used to perform forward Raman amplification of the eastern optical signal. Alternatively, if the optical signal is an eastern optical signal traveling from right to left in FIG. 2 (which means that the optical apparatus 200 would be horizontally flipped to fit into FIG. 1), if the optical apparatus was incorporated into eastern repeater 115($k$), the optical fiber span 241 would be the optical fiber span 114($k$) of FIG. 1, and the portion $k_1$ of the optical pump power would be used to perform backward Raman amplification of the eastern optical signal.

Finally, the optical apparatus 200 may be incorporated into any one of the western repeaters 125($k$), where k is equal to any integer from 1 to m. In that case, the western optical signal could be traveling from left to right in FIG. 2 (which means that the optical apparatus 200 would be horizontally flipped to fit into FIG. 1), in which case optical fiber span 241 would be optical fiber span 124($k$) of FIG. 1. In that case, the portion $k_1$ of the optical pump power would be used to perform forward Raman amplification of the western optical signal. Alternatively, if the optical signal is an western optical signal traveling from right to left in FIG. 2, if the optical apparatus was incorporated into western repeater 125($k$), the optical fiber span 241 would be the optical fiber span 124($k$+1) of FIG. 1. In that case, the portion $k_1$ of the optical pump power would be used to perform backward Raman amplification of the western optical signal.

Referring first to FIG. 2, the optical apparatus 200 includes an optical pump unit 201 for providing optical pump power that optically powers optical amplifiers. An optical power distribution mechanism 211 (which may be, for example, an optical coupler) distributes a portion $(1-k_1)$ (where $k_1$ is a fraction between 0 and 1, non-inclusive of 0 and 1) of the optical pump power to the discrete optical amplifier 231 (using, for example optical multiplexer 222), and a portion $(k_1)$ of the optical pump power is injected into optical fiber span 241 (using, for example, optical multiplexer 221) for use in performing distributed optical amplification. Instead of, or in addition to, introducing optical pump power to the discrete optical amplifier 231 from the left through the optical multiplexer 222, the optical pump power may be introduced to the discrete optical amplifier 231 from the right through the optical multiplexer 223. For simplicity however, the optical multiplexer 223 will not be shown in subsequent drawings that build upon FIG. 2, although the optical multiplexer 223 may be used in addition to, or instead of, the optical multiplexer 222 in FIGS. 3 through 5.

If the optical power distribution mechanism 211 is an optical coupler as is illustrated in FIGS. 2 through 5, the optical pump power is distributed in a manner that preserves the frequency characteristics. As applied to the optical coupler 211, this means that the frequency characteristics of the portion of the optical pump power allocated for the discrete optical amplification unit is approximately the same as the frequency characteristics of the portion of the optical pump power that is for use in the distributed optical amplification.

In one embodiment, the discrete optical amplification unit 231 is a rare-earth doped fiber amplifier such as an Erbium-Doped Fiber Amplifier (EDFA), a Semiconductor Optical Amplifier (SOA) or a high-efficiency Raman amplifier. Alternatively, or in addition, the portion $k_1$ of the optical pump power may be used to perform forward or backward Raman amplification. In that case, since Raman amplification typically takes more optical power than discrete optical amplification, $k_1$ may be closer to 1 than 0, allowing the majority of the optical power to be used for Raman amplification into the optical fiber span 241. In one embodiment, in the case of the discrete optical amplifier being an Erbium-Doped Optical Amplifier, $k_1$ might be, for example, 89%, although the principles described herein are not limited to such a specific embodiment. It may be that if $k_1$ is higher or lower than the 89%, a more optimum performance might be achieved. If the discrete optical amplifier 231 is an Erbium-Doped Fiber Amplifier, then the optical pump power may be primarily in the range of 1400 nanometers to 1525 nanometers. Furthermore, in the case of Raman amplification being the distributed amplification mechanism, the optical signal should have a wavelength that is longer that at least the majority of the optical pump power.

FIG. 3 illustrates an optical apparatus 300 which is similar to the optical apparatus 200 of FIG. 2. However, in this case, an additional optical fiber span 341 is illustrated. If the optical signal travels from left to right in FIG. 2, the optical signal may travel from the optical fiber span 341, through an optical mux/demux 322 through the other optical mux/demux 222 where it is combined with a portion of the optical pump power from the optical pump unit 201. In that case, it is this combination that is then passed into the discrete optical amplifier 231. The amplified signal is then passed through optical mux demux 221 and onto the optical fiber span 241. Alternatively, in the case of an optical signal that travels from right to left in FIG. 2, the optical signal may travel from the optical fiber span 241, through the optical mux/demux 221, through the discrete optical amplifier 231, through the optical mux demux 222, through the optical mux/demux 322 and onto the optical fiber span 341. In any case, the optical signal may include one or more wavelength modulated optical signal channel(s) in the L-band in addition to potentially one or more wavelength modulated optical signal channel(s) in the C-band. Note that the C-band corresponds to optical wavelengths ranging from 1530 nanometers (nm) to 1565 nm, while the L-band corresponds to optical wavelengths ranging from 1565 nm to 1625 nm. In one embodiment, all of the optical wavelengths are greater than 1550 nanometers, with perhaps one or more even exceeding 1567 nanometers.

In addition, the optical pump unit 301 provides optical pump power through the optical power distribution mechanism 311, which may once again be an optical coupler. A portion $k_2$ (where $k_2$ is a fraction between, but not including, 0 and 1) of the optical power is provided to the optical mux/demux 322 and thereby propagated to the optical fiber 341 to perform distributed Raman amplification in the optical fiber link 341. In the case of an optical signal travelling rightward in FIG. 2, this distributed Raman amplification would be backward Raman amplification. In the case of an optical signal traveling leftward in FIG. 2, this distributed Raman amplification would be forward Raman amplification. Another portion $(1-k_2)$ of the optical power is provided to the optical coupler 211, where it is distributed for use as both distributed Raman amplification pump power in the optical fiber link 241 and discrete optical amplifier pump power 231. Since distributed Raman amplification typically requires more optical pump power than a discrete optical amplifiers (e.g., an EDFA), $k_2$ might be closer 1 than 0 (e.g., 95%).

In this case, the optical pump power from the optical pump unit 301 is thus used for at least three gain stages, the first Raman amplification gain stage (via the optical coupler 311 and optical multiplexer 322), the discrete optical amplification gain stage (via the optical coupler 311, the optical coupler 211 and the optical multiplexer 222), and the second Raman amplification gain stage (via the optical coupler 311, the optical coupler 211, and the optical multiplexer 221), all in one signal direction. If one considers the possibility of there being an optically pumped amplifier (such as a Remote Optically Pumped Amplifier or "ROPA") somewhere inline with the optical fiber span 341 or inline with the optical fiber span 241, there may be four or five optical gain stages all served by optical pump power originating from the optical pump unit 301.

Likewise, the optical pump unit 201 also serves multiple optical gain stages in one direction including 1) the discrete optical amplifier 231 (via the optical coupler 211 and the optical multiplexer 222), 2) the distributed Raman amplification (via the optical coupler 211 and the optical multiplexer 221), and 3) an optional ROPA located in the optical fiber span 241.

The optical sharing of FIG. 3 provides significant protection against failure. For instance, the optical pump units 201 and 301 may themselves be provided with redundancy. For instance, the optical pump unit 201 might comprises two optical pumps, one perhaps used as a backup, or with one increasing its output should the other optical pump fail. The same is true of the optical pump unit 301. However, even if all the optical pumps in unit 201 were to fail, the discrete optical amplifier 231 would still be optically powered somewhat by the optical pump unit 301 through the optical couplers 311 and 211. While the performance of the discrete optical amplifier might degrade in the case of the optical pump 201 or 301, the contribution of the other optical pump unit 301 or 201 may keep the optical communications system operational. In the case of a submarine repeater, which cannot be readily accessed upon detecting a failure, the ability to continue operation of the repeater for significant time periods even in light of an optical pump failure is valuable.

FIG. 4 illustrates an optical apparatus 400 that is similar to the optical apparatus 300 of FIG. 3. However, in this case, an additional optical pump unit 401 is provided. A portion $k_3$ (e.g., 50%) of this optical pump power is joined with the optical pump power from the optical pump unit 301 using the optical mux demux 412, which may, for example, be a polarization beam combiner, or another optical component to combine two optical inputs into one optical output. Another portion $(1-k_3)$ (e.g., 50%) of this optical pump power might be provided to a similarly configured optical pump unit in the opposite direction. This distribution is accomplished via optical coupler 411. For instance, since the optical pump unit 301 primarily powers the distributed Raman amplification of the eastern optical signal in optical fiber link 341, the portion $(1-k_3)$ (e.g., 50%) of the optical pump power may be used to power the distributed Raman amplification of the western optical signal. In this case, the additional optical pump unit 401 provides additional protection for all optical gain stages in the case of the failure of either or both of optical pump units 201 and 301. Once again, the optical pump units 201, 301 and 401 may provide optical pump power primarily in the same wavelength range (e.g., 1400 to 1525 nanometer, and in one example, 1480 nanometer). In one embodiment of optical apparatus 400, the portion $k_3$ of pump unit 401 provides full redundancy for pump unit 301 such that a complete failure of pump unit 301 can be fully compensated for by the portion $k_3$ of pump unit 401. In another embodiment of optical apparatus 400, the portion $k_3$ of pump unit 401 provides partial redundancy for pump unit 301.

Thus, the same wavelength of optical pump power may be used to power discrete optical amplifiers (such as Erbium-doped optical amplifiers, forward ROPA and/or backward ROPA) and distributed optical amplifiers (such as backwards and/or forwards Raman amplifiers). This commonality in optical pump wavelength permits sharing of optical pump power across multiple gain stages. This also allows for optical power for each gain stage to be obtained from a fewer number of pumps by performing cross-sharing of optical pump power.

FIG. 5 illustrates an optical apparatus 500 that is similar to the optical apparatus 400 of FIG. 4. However, in this case, two additional optical power distribution components 511 and 512 are provided which may, for example, be optical couplers. The optical coupler 511 draws some $(1-k_4)$ of the optical pump power provided from the optical pump unit 401, and the remainder $k_4$ is provided to the optical coupler 411. The portion $(1-k_4)$ of the optical pump power from the optical pump unit 401 is then provided to the optical coupler 512 where it may be split a portion $k_5$ for joining with the optical pump power provided by the optical pump 301 in optical coupler 311, and a portion $(1-k_5)$ for use in perhaps a similar structure in the other direction. In one embodiment, $k_4$ might be 90% whereas $k_5$ might be 50%. This has the effect of adding some additional pump power to the discrete optical amplifier 231 which reduces the impact of pump failures. This further revision provides additional protection against failure of either or both of optical pump units 201 and 301. In the case where optical coupler 411 supplies a portion of the pump power from pump unit 401 to a pump mux/demux in the other signal direction that is similar or symmetric to pump mux demux 412 and where optical coupler 512 supplies a portion of the pump power from pump unit 401 to an optical coupler in the other signal direction that is similar or symmetric to optical coupler 311, then pump unit 401 provides at least partial redundancy to all other pump units in both directions and therefore at least partially protects all the accessible gain stages in both directions from failures of pumps in other pump units. In one embodiment of optical apparatus 500, $k_1=89\%$, $k_2=95\%$, $k_3=50\%$, $k_4=90\%$, and $k_5=50\%$, which results in an approximate pump sharing as follows (ignoring other transmission factors): 95% $[k_2]$ of pump unit 301 is directed to fiber span 341, 4.5% $[(1-k_2)k_1]$ of pump unit 301 is directed to discrete optical amplifier 231, 0.6% $[(1-k_2)(1-k_1)]$ of pump unit 301 is directed to optical fiber span 241, 89% $[k_1]$ of pump unit 201 is directed to optical fiber span 241, 11% $[(1-k_1)]$ of pump unit 201 is directed to discrete optical amplifier 231, 43% $[k_4k_3k_2+(1-k_4)k_5(1-k_2)]$ of pump unit 401 is directed to optical fiber span 341, 0.8% $[k_4k_3(1-k_2)(1-k_1)+(1-k_4)k_5k_2(1-k_1)]$ of pump unit 401 is directed to optical fiber span 241, and 6.2% $[k_3(1-k_2)k_1+(1-k_4)k_5k_2k_1]$ of pump unit 401 is directed to discrete optical amplifier 231.

The optical pump units of FIGS. 2 through 5 may be any optical pump unit, whether presently existing, or whether to be developed in the future. As an example only, the optical pump units may be a pump that uses Fabry-Perot optical cavity with external wavelength-selective gratings. In an alternative embodiment, the optical units of FIGS. 2 through 5 may be distributed feedback laser which can be more efficient and have lower relative intensity noise than Fabry-Perot based optical pumps. That said, there is no requirement that all of the optical pump units of FIGS. 2 through 5 be of the same type.

Figure 6:
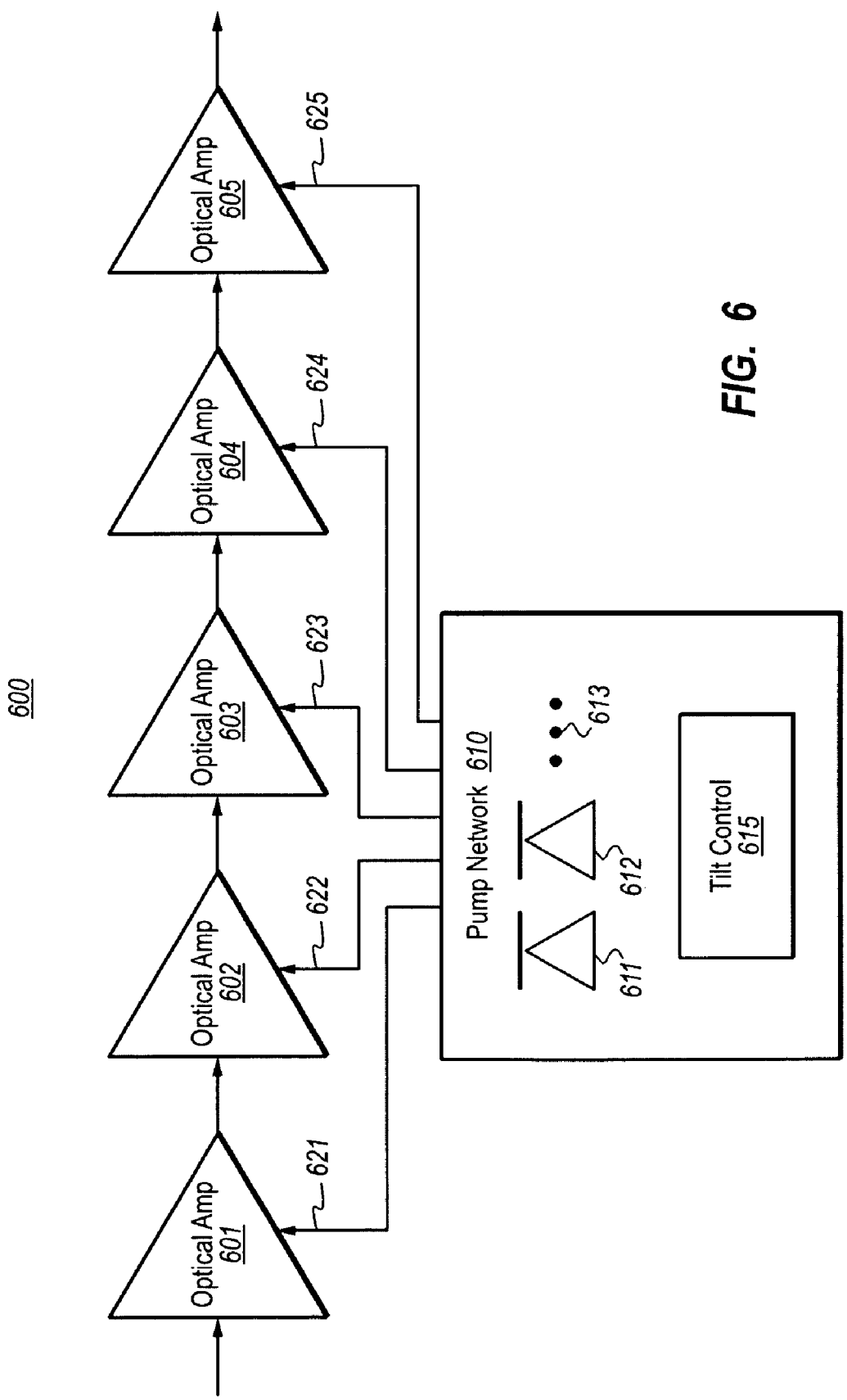
FIG. 6 schematically illustrates an optical communications system that shows that there are multiple optical gain stages in a particular direction of optical communication.

FIG. 6 illustrates an optical communications system showing just one direction in an optical communication path 600. In this case, the particular direction is eastward, but the principles also apply to the western direction. The eastern optical communication path 600 includes potentially up to five or more optically powered gain stages. These are illustrated as including optical amplifiers 601, 602, 603, 604 and 605. An optical pump network 610 includes one or more pumps. The optical pump network 610 is symbolically illustrated as including two optical pumps 611 and 612, although the ellipses 613 represents that there may be three or more, or perhaps just one pump unit in the optical pump network 610. Each pump unit may be configured to optical power two, three, four, five, or even more optical gain stages in a signal optical communication direction. This is represented symbolically by arrows 621 through 625.

In FIG. 3, for example, the pump network includes pumps 201 and 301, where pump unit 201 optically powers up to three optical gain stages including 1) the discrete optical amplifier 231, 2) the distributed Raman amplifier in fiber span 241, and 3) the ROPA if present in fiber span 241. The pump unit 301 in FIG. 3 optically powers up to five optical gain stages including 1) the first distributed Raman amplifier in fiber span 241, 2) the first ROPA if present in fiber span 241, 3) the discrete optical amplifier 231, 4) the second distributed Raman amplifier in fiber span 341, and 5) the second ROPA if present in fiber span 341. In addition, in the cross-coupled configuration that will be described with respect to FIGS. 8A and 9, the pump units 201 and 301 may each contribute to optical powering of gain stages in the opposite direction as well.

In FIGS. 4 and 5, for example, the pump network includes pumps 201, 301 and 401. Pumps 201 and 301 optically pump up to three and five, respectively, optical gain stages as previously mentioned. However, in FIGS. 4 and 5, the optical pump 401 provides optical pump power also to all five optically pumped gain stages.

One or more of the optical gain stages 601 through 605 might optically amplify different wavelengths of light differently. For example, one or more of the optical gain stages optically amplify longer wavelengths of light with greater gain at least within the wavelength range of the optical signal (hereinafter referred to as "positive gain slope with respect to wavelength" optical gain stages or perhaps simply "positive gain slope" optical gain stages). Another one or more of the optical gain stages optically amplify longer wavelengths of light with lesser gain at least within the wavelength range of the optical signal (hereinafter referred to as "negative gain slope with respect to wavelength" optical gain stages or perhaps simply "negative gain slope" optical gain stages).

The pump network 610 may include a tilt control mechanism 615, which measures whether the overall system has positive or negative wavelength dependency in the overall gain. In the case of there being an overall positive gain slope with respect to wavelength, the tilt control mechanism 615 may respond by increasing the optical power supplied to the negative gain slope optical gain stage(s) and/or decreasing the optical power supplied to the positive gain slope optical gain stage(s). In the case of there being an overall negative wavelength dependency in the gain, the tilt control mechanism 615 may respond by decreasing the optical power supplied to the negative gain slope optical gain stage(s) and/or increasing the optical power supplied to the positive gain slope optical gain stage(s).

Figure 7:
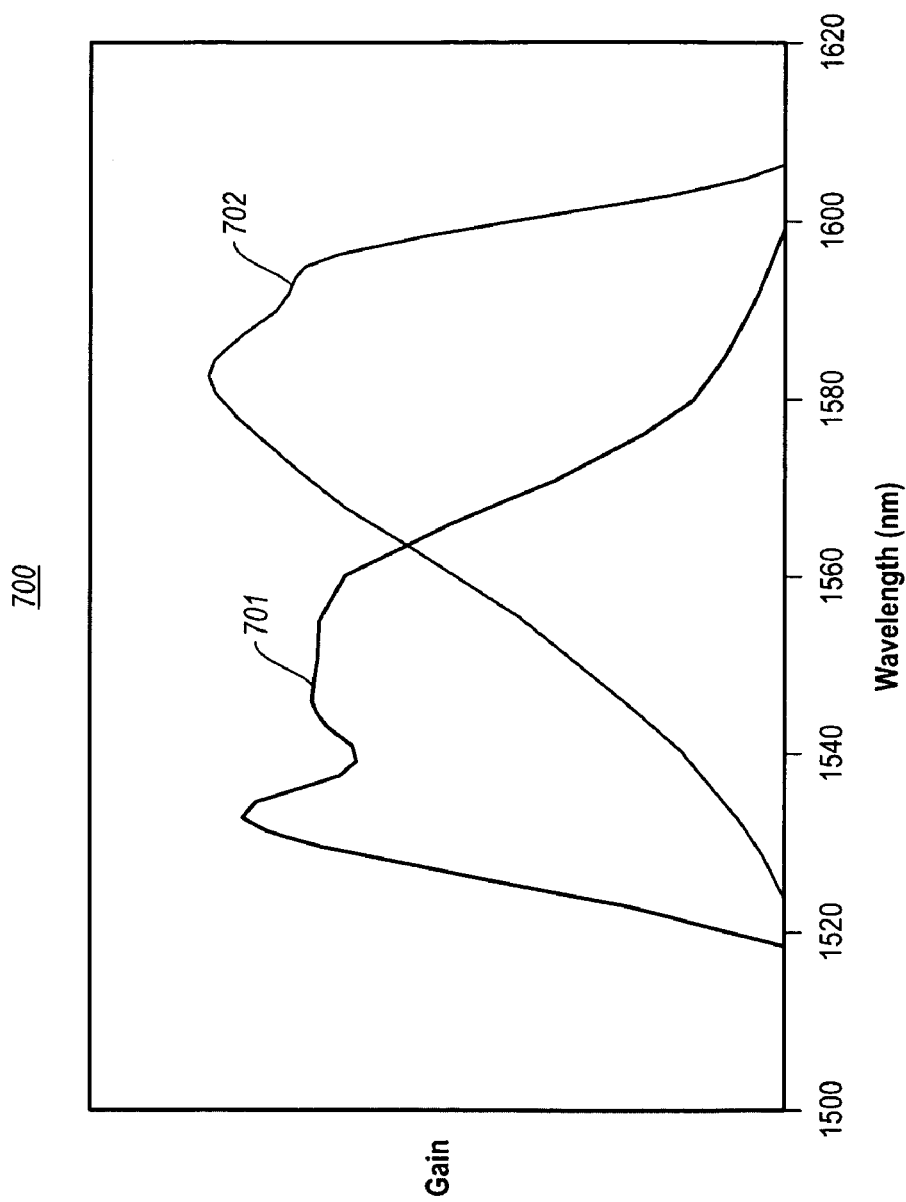
FIG. 7 illustrates an example of positive and negative gain slope with respect to wavelength that may be associated with optical gain stages.

FIG. 7 shows an example 700 of positive and negative wavelength dependency of optical gain stages when a single optical pump wavelength of 1480 nanometers is used to power the optical gain stages. Curve 701 shows a typical erbium gain profile when a 1480 nm optical pump is applied. Curve 702 shows a Raman gain profile when a 1480 nm optical pump is applied. In FIG. 3, for example, the discrete optical amplifier 231 may be erbium gain stage, and a Raman gain stage can be distributed Raman amplification in optical fiber 341, or 241. Even though the pump wavelength 301 and 201 are approximately same, wavelength dependency of the pump 301 and 201 can be controlled by adjusting the coupling ratio $k_1$ and $k_2$ and/or selecting fiber types of the span 341, 241. For example, high coupling ratio $k_2 > 0.9$ and small core area fiber with higher Raman gain in optical fiber 341 create a positive wavelength dependency on pump 301; whereas large core area fiber with lower Raman gain in optical fiber 241 combined with gain from discrete optical amplifier 231 create a negative wavelength dependency on pump 201. For example, suppose $k_1$ is selected to be 89%, $k_2$ is selected to be 95%, the signal direction is from left to right, the fiber span 341 is 40 km of IDF fiber (manufactured by OFS with 30 $\mu m^2$ effective area), the fiber span 241 is 40 km of SLA fiber (manufactured by OFS with 106 $\mu m^2$ effective area), the ROPA on fiber span 241 is 8 m of Erbium-doped fiber (R37014 manufactured by OFS) located at 40 km from pump mux 221, the discrete optical amplifier 231 is Erbium-doped fiber (15 m R37003X or similar manufactured by OFS), the pump unit 301 is 0.25 W at 1480 nm, pump unit 201 is 0.25 W at 1480 nm. In that case, the optical gain of pump unit 301 will have a positive wavelength dependency when the pump power is increased and pump unit 201 will have a negative wavelength dependency when the pump power is increased (or the opposite wavelength dependencies on pump power decrease). In this example, the Raman gain is high on fiber span 341 due to the small effective area fiber and the Raman gain is low on fiber span 241 due to the large effective area fiber, whereas the Erbium-doped gain is high and primarily powered by pump unit 201.

Figure 8A:
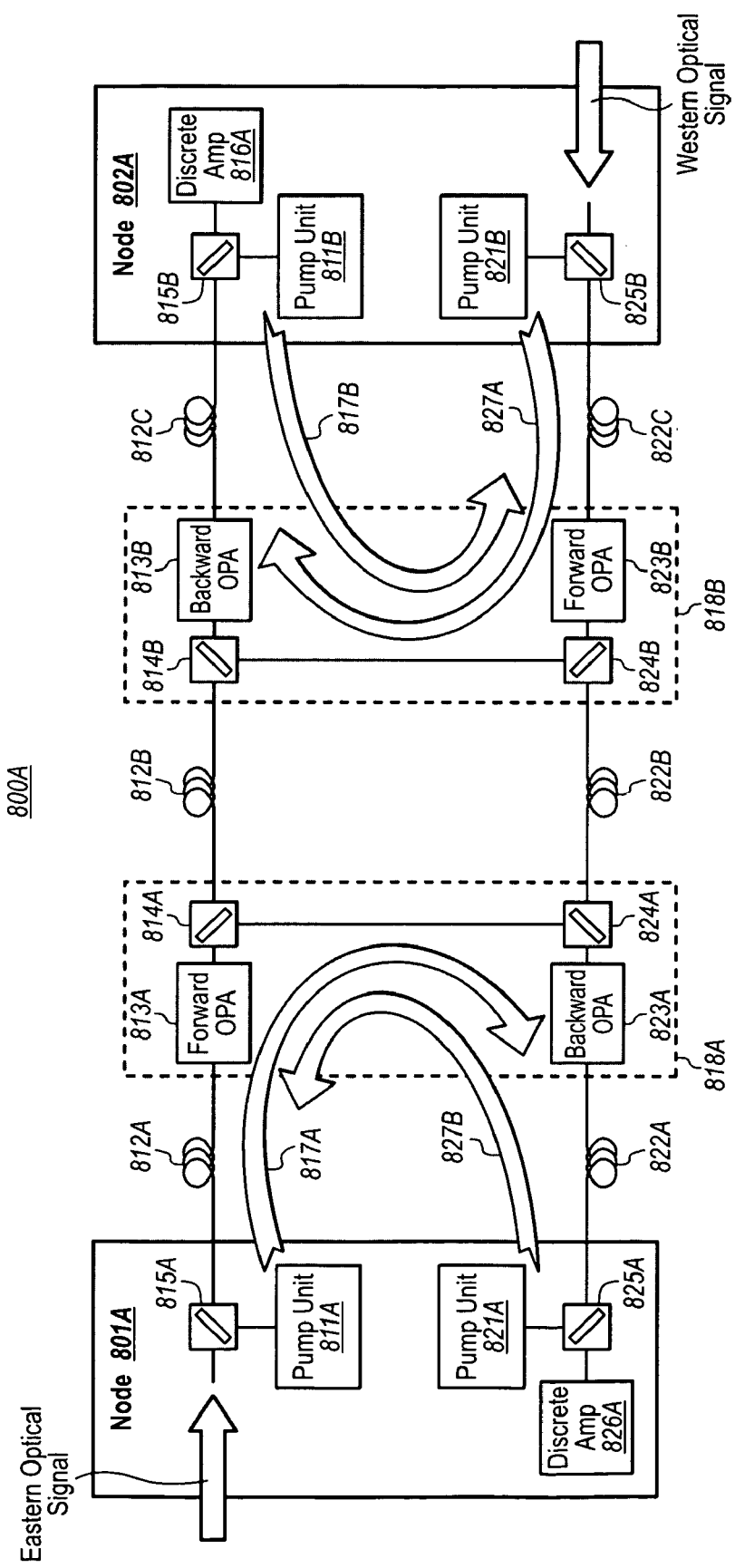
FIG. 8A illustrates an optical link that connects two nodes in an optical communication network such as that of FIG. 1, and that includes a forward optically pumped amplifier, and a backward optically pumped amplifier for each optical communication direction, and in which the optically pumped amplifiers are cross-coupled.
Figure 9:
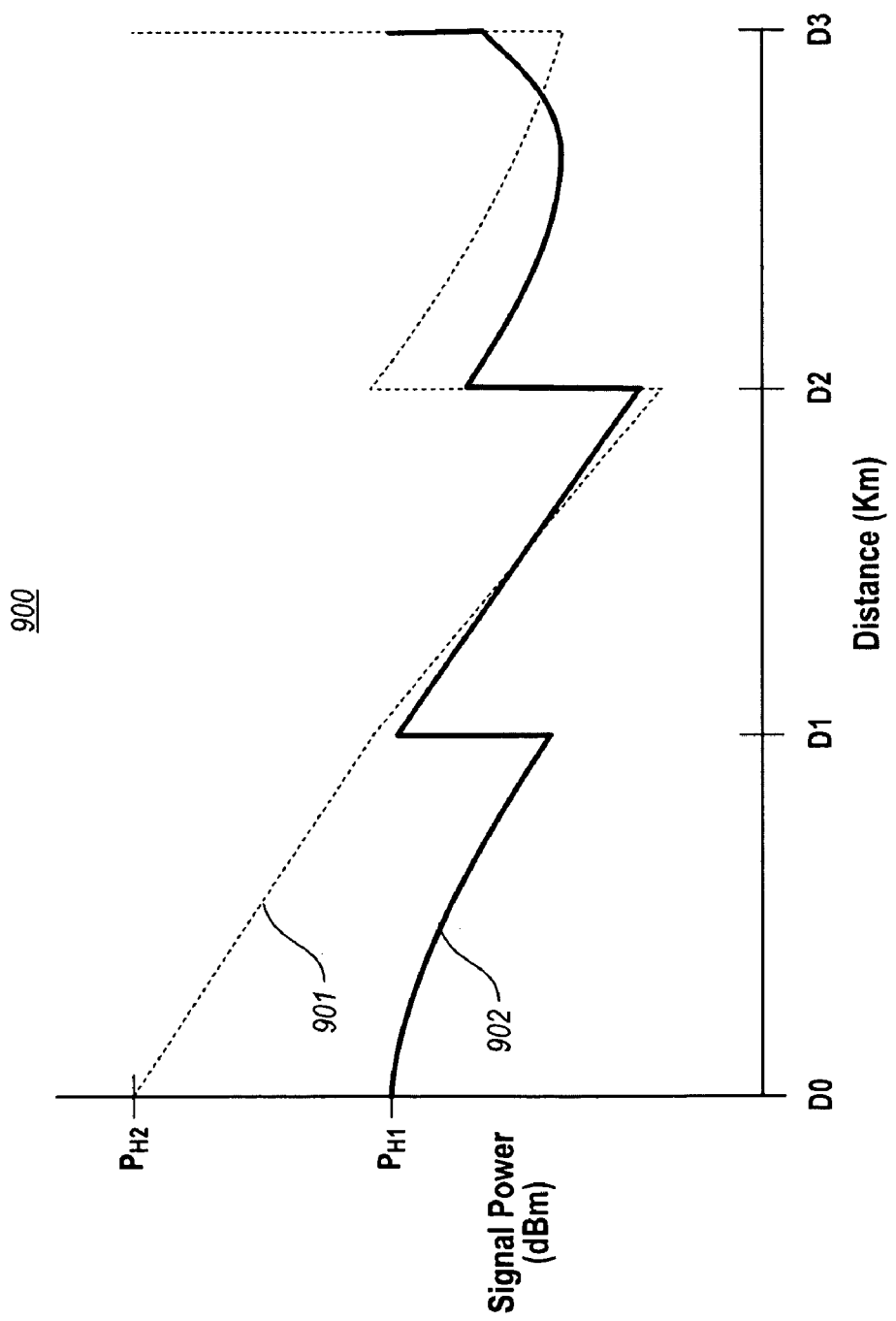
FIG. 9 illustrates example optical power profiles of an eastern optical signal as it travels eastwardly in FIGS. 8A and 8B.

Accordingly, the principles described herein provide an effective mechanism for potentially improving the reliability and performance of an optical communications system. FIGS. 8A and 9 are provided to illustrate a particular environment in which the principles described herein may operate, although the general principles described herein are not limited to that environment. The environment of FIGS. 8A and 9 provides both forward and backward ROPAs, the forward ROPA for using residual forward Raman optical pump power, and the backward ROPA for using residual backward Raman optical pump power.

FIG. 8A illustrates an optical link 800A that connects two nodes 801A and 802A in an optical communication network. For instance, if the optical link 800A is used in the optical communications system 100 of FIG. 1, and the optical communications system 100 is an unrepeatered system, the node 801A may be the terminal 101 and the node 802A may be the terminal 102. However, in a repeatered environment, nodes 801A and 802A may be a terminal on one end and a repeater set on another. For instance, node 801A might be terminal 101 of FIG. 1, whereas node 802A might be the repeater set 115(1) and 125(1) of FIG. 1. On the other hand, node 801A might be the repeater set 115(m) and 125(m) of FIG. 1, whereas node 802A might be the terminal 102 of FIG. 1. If there is more than one repeater (i.e., m>1) in the repeatered environment, it is possible that both nodes 801A and 802A may both be repeater sets. Generally stated, if nodes 801A and 802A are both repeater sets, node 801A may be repeater set 115(k) and 125(k) of FIG. 1, whereas node 802A may be repeater set 115(k+1) and 125(k+1) of FIG. 1, where k is any positive integers from 1 to a maximum of m−1.

For instance, nodes 801A and 802A may comprise the optical apparatus 200, 300, 400, or 500 of FIGS. 2, 3, 4, or 5, respectively. For example, pump unit 811A, pump mux 815A, and fiber span 812A of FIG. 8A may correspond to pump unit 201, pump mux 221, and fiber span 241 of FIG. 5, respectively; pump unit 811B, pump mux 815B, discrete amplifier 816A, and fiber span 812C of FIG. 8A may correspond to pump unit 301, pump mux 322, discrete amplifier 231, and fiber span 341 of FIG. 5, respectively; forward OPA 813A of FIG. 8A may correspond to a ROPA in fiber span 241 of FIG. 5; and backward OPA 813B of FIG. 8A may correspond to a ROPA in fiber span 341 of FIG. 5. Nodes 801A and 802A may comprise the pump distribution components 211, 311, 411, 412, 511, and/or 512 of FIGS. 2, 3, 4, or 5 although this is not explicitly drawn in FIG. 8A. Similar correspondence may apply to nodes 801A and 802A for the components in the path of the western optical signal of link 800A. It would be apparent to one of ordinary skill in the art after having read this description that the principles described in FIGS. 2, 3, 4, and 5 may apply to optical link 800A.

The optical link 800A is bidirectional and includes an eastern fiber link and a western fiber link. The eastern fiber link propagates the eastern optical signal from the node 801A to the node 802A. The western fiber link propagates the western optical signal from the node 802A to the node 801A. Recall, however, that the terms "eastern" and "western" are used herein merely to distinguish one signal from another and not to represent any sort of actual geographical relation or direction. Components or gain stages within the eastern fiber link will also be sometimes modified herein by the term "eastern", and components or gain stages within the western fiber link will also be sometimes modified herein by the term "western".

The eastern fiber link transmits the eastern optical signal through the initial eastern optical fiber span 812A, through the eastern forward Optically Pumped Amplifier (OPA) 813A, through a first eastern optical multiplexer/demultiplexer (hereinafter, "mux/demux") 814A, through the eastern intermediate optical fiber span 812B, through a second eastern optical mux demux 814B, through the backward OPA 813B, and through the final eastern optical fiber span 812C to the node 802A. In so doing, the optical signal may go through a number of gain stages for each direction. For example, the eastern optical signal may potentially pass through forward Raman amplification gain stage 812A, forward OPA 813A, backward OPA 813B, backward Raman amplification gain stage 812C, and discrete gain stage 816A in node 802A.

Note that the term "forward" and "backward" OPA refers to the direction of the optical pump relative to the signal direction, whereby the optical pump of the "forward" OPA is in the same direction as the signal and the optical pump of the "backward" OPA is in the opposite direction as the signal.

As a potential first gain stage for the eastern optical link, the optical fiber span 812A may serve as a distributed forward Raman amplifier, being powered by the optical pump unit 811A. The eastern optical signal transmitted from node 801A to node 802A represents the actual information communicated eastward. The pump unit 811A, on the other hand, transmits optical pump power that has a higher frequency (shorter wavelength) that is outside of the optical signal band. That energy is converted to the signal wavelength(s) to optically amplify the optical signal. The pump unit 811A provides forward Raman pump power into the optical fiber span 812A using optical mux demux 815A to thereby co-propagate with and amplify the optical signal in a distributed manner along the optical fiber span 812A.

FIG. 9 illustrates an example power-distance optical profile diagram 900 of two power-distance optical profiles 901 and 902. This solid-lined power profile 902 shows an optical signal power as the optical signal travels through the eastern fiber link of FIG. 8A in the case where all illustrated gain stages are present. An example power-distance profile is not shown for the western optical link, although the power-distance profile may be similar to the power profile 902, but reversed. That said, there is no requirement for symmetry in optical power profiles in the eastern and western optical fiber links. In FIG. 9, a maximum power for the power profile 902 is illustrated as $P_{H1}$. Positions D0 and D3 represent the positions of the node 801A and the node 802A, respectively. Positions D1 and D2 represent the positions of the forward OPA 813A and backward OPA 813B, respectively.

In the first gain stage that occurs between distance D0 and D1 in the optical fiber span 812A, the forward Raman amplification initially slows the attenuation of the optical signal in the power profile 902, but as the forward Raman amplification diminishes further from distance D0, the approximate logarithmically linear attenuation of the optical fiber begins to dominate. That said, however, even when the optical fiber attenuation dominates, the forward Raman amplification is still sufficient to mitigate the optical fiber attenuation as compared to the attenuation that would occur without forward Raman amplification. In one embodiment, the forward Raman amplification has an on/off gain of at least 1 dB over the distance from D0 to D1, but could be much higher. In this description and in the claims, the "on/off" gain of Raman amplification over a distance refers to the increase in optical signal power of at least one of the one or more signal wavelengths caused by the Raman amplification over that distance as compared to the signal power that would occur without Raman amplification over that distance. FIG. 9 is not necessarily drawn to scale, and is not necessarily intended to convey an actual optical power-distance profile, but is merely used to describe the power profile from a general perspective.

Returning to FIG. 8A, as a second gain stage, the residual forward Raman optical pump power is then used to power the forward OPA 813A, which then amplifies the eastern optical signal. Although the forward OPA 813A is shown as a discrete amplifier, it may be distributed over all or part of fiber span 812A. The OPAs 813A, 813B, 823A and 823B illustrated in FIG. 8A may be what is more commonly referred to as "Remote Optically Pumped Amplifiers" or (ROPAs). However, the term "remote" is not desired for this patent application since the term is relative. In one embodiment, however, the OPAs are at least 30 kilometers in optical path distance from the nearest repeater or terminal, and the optical path distance between nodes 801A and 802A is at least 100 kilometers, but may even be greater than 300 kilometers, perhaps even surpassing 500 kilometers. Referring to FIG. 9, the discrete amplification in the power profile 902 at distance D1 is a result of the forward OPA 813A.

The OPAs 813A, 813B, 823A and 823B may each be any optically pumped amplifier. Examples include rare-earth doped fiber amplifiers (such as Erbium-doped fiber amplifiers), optically-pumped semiconductor amplifiers, or perhaps highly efficient Raman amplifiers.

Note that in the optical link 800A, there is a forward OPA as well as a backward OPA in each direction. For instance, for the eastern channel, the forward OPA 813A is more proximate the node 801A, and the backward OPA 813B is more proximate the node 802A. This allows for more efficient use of the residual forward and backward Raman optical pump power to power the OPAs, and itself represents a significant advancement in the art permitting the distance between nodes 801A and 802A to be extended, all other things being equal. The western channel also has a forward OPA 823B that is more proximate the node 802A and the backward OPA 823A that is more proximate the node 801A, resulting in potential efficiency improvement for the western optical channel as well. This efficient use of this optical power is especially beneficial in a submarine repeater, in which electrical power is at a premium.

Returning to the eastern optical fiber link, there is still some residual forward optical pump power remaining even after the forward Raman amplification that occurred in the optical fiber span 812A, and even after the amplification by the forward OPA 813A. At least some, and potentially all, of that residual forward optical pump power is diverted to the opposite optical fiber link for use in the backward OPA 823A. This general diversion of this forward Raman optical pump power is represented generally by the arrow 817A. The resulting amplification in the backward OPA 823A may be significantly more than the forward Raman amplification that may have occurred in the eastern intermediate optical fiber span 812B had the residual forward pump optical power been allowed to continue further in the eastern optical fiber link into the intermediate optical fiber 812B.

To facilitate this diversion, an optical mux/demux 814A is placed east of the forward OPA 813A. This optical mux/demux 814A permits the eastern optical signal (or at least a majority of that signal) to pass through into the intermediate optical fiber span 812B, but diverts optical pump power towards another optical mux/demux 824A in the western optical fiber link. The optical mux demux 824A then injects this residual optical pump power into the backward OPA 823A for help in powering the backward OPA 823A. On the other hand, amplification of the forward OPA 813A may also be assisted by the diversion of residual backward Raman pump optical power from the western optical fiber link. This is represented generally by the arrow 827B. However, more regarding this diversion will be described further below.

Returning to the eastern channel, the eastern optical signal passes into the intermediate optical fiber span 812B, where it does not experience much, if any, amplification at all. Instead, referring to FIG. 9, the optical power attenuates approximately logarithmically linearly in the distanced between D1 and D2, which corresponds to the length and attenuation of the optical fiber span 812B.

As a third optical gain stage, the optical signal passes through the second eastern mux demux 814B and then is amplified by the backward OPA 813B. Although the backward OPA 813B is shown as a discrete amplifier, it may be distributed over all or part of fiber span 812C. Part of the optical pump power used to supply the backward OPA 813B is due to a residual amount of backward Raman pump optical power from the pump unit 811B. A remaining amount is due to diversion of forward Raman pump optical power from the opposite optical fiber link as represented by the arrow 827A. If the forward Raman pumping of the western optical link is not efficient, then there might be a significant amount of forward optical pump power remaining to be diverted into the eastern optical link.

In one embodiment, the backward Raman amplification performed in the optical fiber span 812C for the eastern signal (and in optical fiber span 822A for the western signal) is quite efficient allowing strong distributed gain in the optical fiber span 812C compared to forward Raman amplification of eastern signal in optical fiber span 812A (and western signal in optical fiber span 822C). This high gain means, however, that there is relatively little residual optical pump power remaining to power the backward OPA 813B. Accordingly, the diverted forward Raman pump optical power 827A from the western optical link (and 817A from the eastern optical link) helps a great deal when used to optically power the backward OPA 813B of the eastern optical fiber link (and backward OPA 822A of the western optical fiber link). In one embodiment, the optical fiber spans 812C and 822A are primarily negative chromatic dispersion (D−) fiber, or at least have a relatively smaller effective cross-sectional area for propagation of light. In this description and in the claims, a "DS fiber" is defined as a fiber that has an effective cross-sectional area of less than 65 µm$^2$ independent of the dispersion characteristics. Thus, the optical fiber spans 812C and 822A may be comprised of DS fiber. The optical fiber spans 812A and 822C, on the other hand, may be positive chromatic dispersion (D+) fiber, or at least have a relatively larger effective cross-sectional area as compared to the optical fiber spans 812C and 822A. In this description and in the claims, a "DL fiber" is defined as a fiber that has an effective cross-sectional area of greater than 65 µm$^2$ independent of the dispersion characteristics. Thus, the optical fiber spans 812A and 822C may be comprised of DL fiber. In this case, the backward OPA 813B is helped greatly by the diverted optical pump power from the opposite optical link represented by arrow 827A. Generally, signal power at the backward OPA 813B is less than at the forward OPA 813A due to uncompensated fiber attenuation in span 812B. Therefore, more amplification can typically be achieved in the backward OPA 813B compared to the forward OPA 813A given the same OPA and same amount of pump power. In other words, higher pump power is typically required in forward OPA 813A to achieve similar gain compared to backward OPA 813B.

As the fourth optical gain stage, and as alluded to already, the pump unit 811B provides backward Raman pump optical power to thereby perform backward Raman amplification in the optical fiber 812C. Referring to FIG. 9, this results in distributed backward Raman amplification occurring between distances D2 and D3. The power profile 902 of FIG. 9 shows this distributed gain between distances D2 and D3, which is much larger than the distributed gain in the power profile 902 between D0 and D1 due to the use of D− and D+ fiber as described above. In one embodiment, the backward Raman amplification has an on/off gain of at least 5 dB over the distance from D2 to D3, but could be much higher. The backward Raman pump power of pump unit 811B is injected into the optical fiber span 812C using the optical mux demux unit 815B. Following along arrow 817B, the backward Raman pump optical power is degraded, however, upon performing backward Raman amplification in the optical fiber span 812C. As previously mentioned, the residual backwards Raman pump optical power is then used to power the backward OPA 813B. A residual amount remaining after the backward OPA 813B is then diverted using optical mux/demux 814B into the western optical fiber link using optical mux/demux 824B for use in optically powering the forward OPA 823B in the western optical fiber link.

In node 802A, discrete amplifier 816A provides the fifth optical gain stage. For example, discrete amplifier 816A may amplify the optical signal to the next transmission optical fiber (if it is used in a repeater) or to the receiver (if it is located in a terminal). Referring to FIG. 9, this discrete amplification may occur at distance D3, corresponding to node 802A. If the node 802A is a terminal, the eastern optical signal may then be directed to the terminal receivers such as, for example, receivers 118 of FIG. 1. If the node 802A is a repeater, the eastern optical signal may then be transmitted (perhaps after other processing such as, for example, chromatic dispersion compensation, and gain-flattening filtering) to yet other nodes in the optical communication system. Although not shown, there may be optical isolators keeping west bound optical signals from entering or exiting the eastern optical fiber link.

As for the western optical link, there may once again be five gain stages. The first potential gain stage is the optical fiber span 822C which serves as a distributed forward Raman amplifier, being powered by the optical pump unit 821B. The western optical signal transmitted from node 802A to node 801A represents the actual information communicated westward. The pump unit 821B, on the other hand, transmits optical pump power that has a higher frequency (shorter wavelength) that is outside of the optical signal band. That energy is converted to the signal wavelength(s) to optically amplify the optical signal. The pump unit 821B provides that forward Raman pump power into the optical fiber span 822C using the optical mux/demux 825B to thereby co-propagate with and amplify the optical signal in a distributed manner along the optical fiber span 822C.

As a second gain stage, the residual forward Raman optical pump power is then used to power the forward OPA 823B, which then discretely amplifies the western optical signal.

In the western optical fiber link, there is still some residual forward optical pump power remaining even after the forward Raman amplification that occurred in the optical fiber span 822C, and even after the amplification by the forward OPA 823B. At least some, and potentially all, of that residual forward optical pump power is diverted to the opposite optical fiber link for use in the backward OPA 813B, as previously mentioned. This general diversion of this forward Raman optical pump power is represented generally by the arrow 827A. The resulting amplification in the backward OPA 813B may be significantly more than the forward Raman amplification that may have occurred in the western intermediate optical fiber span 822B had the residual forward pump optical power been allowed to continue further in the western optical fiber link into the intermediate optical fiber 822B.

To facilitate this diversion, an optical mux demux 824B is placed west of the forward OPA 823B. This optical mux demux 824B permits the western optical signal (or at least a majority of that signal) to pass through into the intermediate optical fiber span 822B, but diverts optical pump power towards another optical mux/demux 814B in the eastern optical fiber link. The optical mux demux 814B then injects this residual optical pump power into the backward OPA 813B for help in powering the backward OPA 813B. On the other hand, amplification of the forward OPA 823B may also be assisted by the diversion of residual backward Raman pump optical power from the eastern optical fiber link, as previously described, and as represented by the arrow 817B.

The western optical signal passes into the intermediate optical fiber span 822B, where it does not experience much amplification at all. Instead, optical power attenuates approximately logarithmically linearly as optical signals are known to do as they pass through optical fiber without amplification.

As a third optical gain stage, the western optical signal passes through the western mux demux 824A and then is discretely amplified by the backward OPA 823A. Part of the optical pump power used to supply the backward OPA 823A is due to a residual amount of backward Raman pump optical power from the pump unit 821A. A remaining amount is due to diversion of forward Raman pump optical power from the eastern optical fiber link as represented by the arrow 817A.

As the fourth optical gain stage, and as alluded to already, the pump unit 821A provides backward Raman pump optical power to thereby perform backward Raman amplification in the optical fiber 822A. The backward Raman pump optical power is injected into the optical fiber span 822A using the optical mux/demux unit 825A. Following along arrow 827B, the backward Raman pump optical power is degraded, however, upon performing backward Raman amplification in the optical fiber span 822A. As previously mentioned, the residual backwards Raman pump optical power is then used to power the backward OPA 823A. A residual amount remaining after the backward OPA 823A is then diverted using optical mu demux 824A into the eastern optical fiber link using optical mux/demux 814A for use in optically powering the forward OPA 813A in the eastern optical fiber link.

In node 801A, the fifth gain stage may be the discrete amplifier 826A, which amplifies the optical signal to the next transmission optical fiber or to the receivers if the node 801A is located in terminal. If the node 801A is a terminal, the western optical signal may then be directed to the terminal receivers such as, for example, receivers 128 of FIG. 1. The discrete amplifiers 816A and 826A may be any amplifier that is capable of amplifying light, whether powered by electricity or optical power. Examples include rare-earth doped fiber amplifiers (such as Erbium-doped fiber amplifiers), high efficiency Raman amplifiers, and/or a Semiconductor Optical Amplifier (SOA).

If the node 801A is a repeater, the western optical signal may then be transmitted (perhaps after other processing such as, for example, chromatic dispersion compensation, and gain-flatten filtering) to yet other nodes in the optical communication system. Although not shown, there may be optical isolators keeping east bound optical signals from entering or exiting the western optical fiber link.

Accordingly, in FIG. 8A, there are four examples of cross fiber optical power diversion as follows:

A) diversion of forward Raman pump power from the eastern optical fiber link to supplement the optical powering of the backward OPA in the western optical fiber link (hereinafter referred to as "diversion type A") which is represented in FIG. 8A by arrow 817A;

B) diversion of forward Raman pump power from the western optical fiber link to supplement the optical powering of the backward OPA in the eastern optical fiber link (hereinafter referred to as "diversion type B") which is represented in FIG. 8A by arrow 827A;

C) diversion of backward Raman pump power from the eastern optical fiber link to supplement the optical powering of the forward OPA in the western optical fiber link (hereinafter referred to as "diversion type C") which is represented in FIG. 8A by arrow 817B; and D) diversion of backward Raman pump power from the western optical fiber link to supplement the optical powering of the forward OPA in the eastern optical fiber link (hereinafter referred to as "diversion type D") which is represented in FIG. 8A by arrow 827B.

One embodiment of diversion type A, as depicted in FIG. 8A, comprises both a forward OPA 813A and a backward OPA 823A. In another embodiment of diversion type A, only one OPA (either 813A or 823A) is employed. One embodiment of diversion type B, as depicted in FIG. 8A, comprises both a forward OPA 823B and a backward OPA 813B. In another embodiment of diversion type B, only one OPA (either 823B or 813B) is employed. One embodiment of diversion type C, as depicted in FIG. 8A, comprises both a forward OPA 823B and a backward OPA 813B. In another embodiment of diversion type C, only one OPA (either 823B or 813B) is employed. One embodiment of diversion type D, as depicted in FIG. 8A, comprises both a forward OPA 813A and a backward OPA 823A. In another embodiment of diversion type D, only one OPA (either 813A or 823A) is employed.

In FIG. 8A, all of the diversion types A, B, C and D are shown. However, the principles described herein may apply if there are fewer than all of these diversion types present as well. For instance, the principles described herein may provide benefits even if just one, two or three of the diversion types A, B, C and D are provided.

Referring to FIG. 8A, the OPAs 813A and 823A, and the optical mux/dumuxes 814A and 814B may be encompassed within a single assembly 818A. In that case, the assembly 818A might be pre-manufactured and may be, for example, a splice box. The box would have at least four ports for each fiber pair; namely, an eastern fiber input terminal (e.g., proximate the forward OPA 813A), an eastern fiber output terminal (e.g., proximate the optical mux demux 814A), a western fiber input terminal (e.g., proximate the optical mux/demux 824A), and a western fiber output terminal (e.g., proximate the backward OPA 823A). The assembly 818A has an eastern optical channel and a western optical channel. The eastern optical channel is between the eastern input and output terminals that includes the forward OPA 813A and the optical mux/demux 814A. The western optical channel is between the western input and output terminals that includes the optical mux demux 824A and the backward OPA 823A.

The assembly 818B also includes a forward OPA 823B, a backward OPA 813B, and two optical mux/demuxes 824B and 814B, and may be similarly configured as described for the assembly 818A. However, the assembly 818A may be simplified in the case where not all of the diversion types A and D are employed. For example, if only diversion type A is employed represented by arrow 817A, the backward OPA 823A may be placed to the east of or to the west of the optical multiplexer 824A. Furthermore, forward OPA 813A might not be present all. If only diversion type D is employed represented by arrow 827B, the forward OPA 813A may be placed to the east of or to the west of the optical multiplexer 814A. Furthermore, backward OPA 823A might not be present all. Assembly 818B may have similar simplifications in the case of there only being one or diversion types B and C.

Figure 8B:
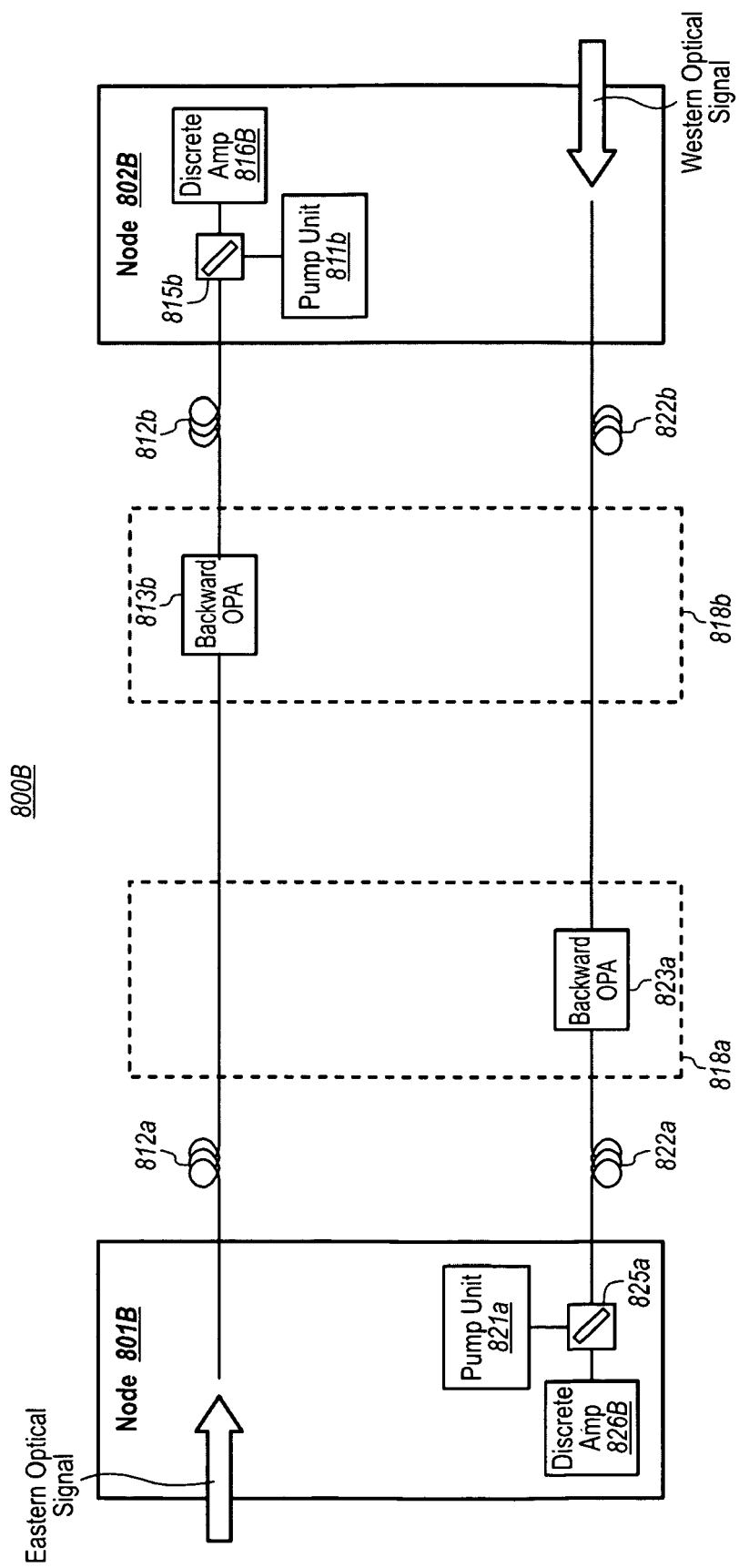
FIG. 8B illustrates a prior art configuration of a submarine optical link.

As previously mentioned, conventional submarine repeater technology has increased the repeater spacing by using a discrete Erbium-doped fiber amplifier (EDFA) within the repeater in combination with 1) distributed backward Raman amplification, 2) distributed backward Raman amplification which additionally pumps a remote discrete EDFA, or 3) a remote discrete EDFA without Raman amplification. FIG. 8B shows a prior art repeater link 800B between two nodes 801B and 802B. In contrast to the link 800A of FIG.

8A, the conventional submarine repeater link 800B does not employ forward Raman amplification, a forward Remote Optically Pumped Amplifier (ROPA), or cross-coupling of optical pump power. Instead, the submarine repeater link 800B may employ backward Raman amplification (through the fiber 812b using pump unit 811b in the case of the eastern optical signal, and through the fiber 822a using pump unit 821a in the case of the western optical signal). In addition, the residual optical pump power from the backward Raman amplification is used to power a Remote Optically Pumped Amplifier (ROPA) (i.e., ROPA 813b in the case of the eastern optical signal, and ROPA 823a in the case of the western optical signal). In some conventional submarine repeater designs, the Raman amplification in fiber 812b and 822b is suppressed by selecting wavelengths in pump units 811b and 821a which provide only minimal Raman amplification to the optical signals in order to provide maximum attenuated residual power from the pump units 811b and 821a to the backward OPAs 813b and 823a, respectively. Of course, discrete amplification using amplifiers 826B and 816B may be performed at the nodes 801B and 802B themselves.

Figure 8C:
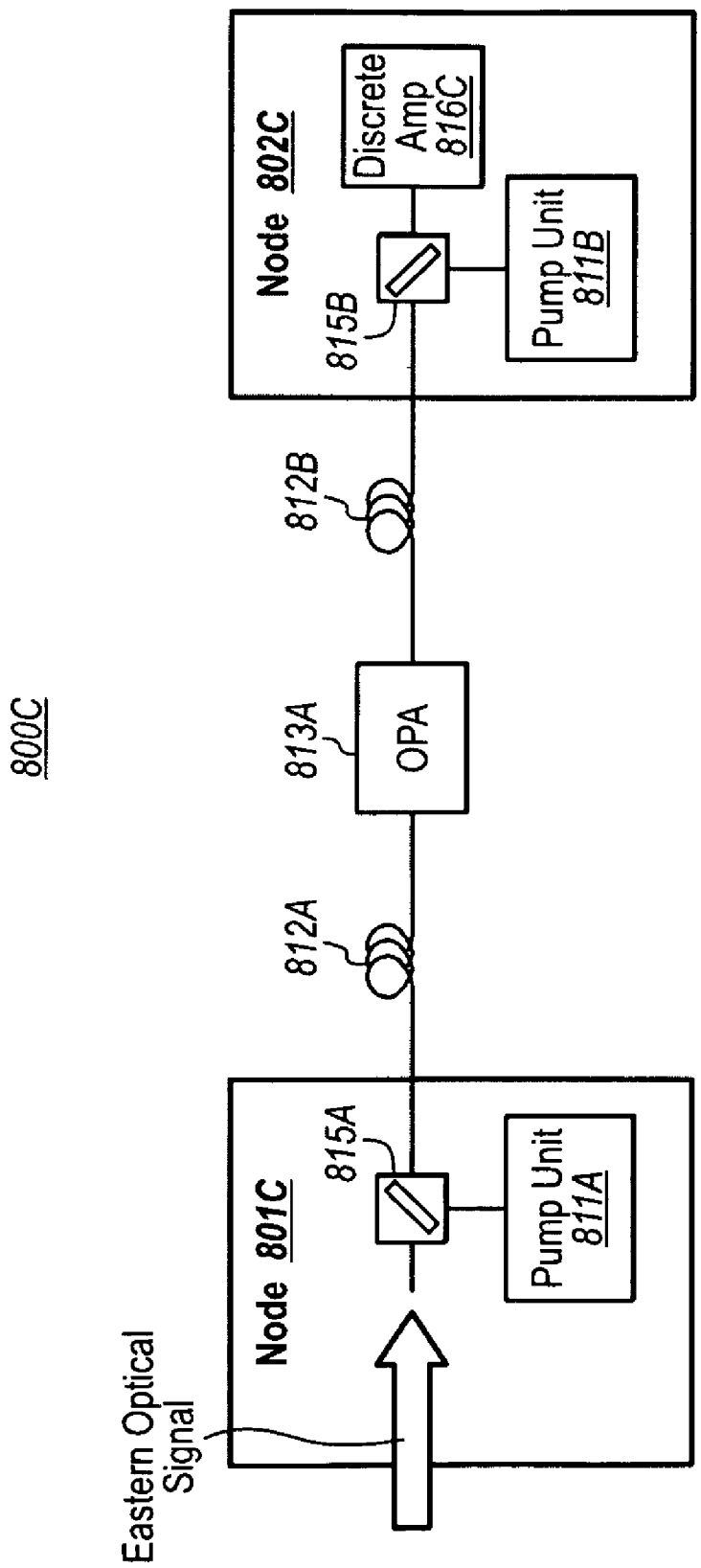
FIG. 8C illustrates an optical link that connects two nodes in an optical communication network such as that of FIG. 1, and that includes a remote optically pumped amplifier which is optically pumped in both the forward and backward directions.

Returning to FIG. 9, another power profile 901 is shown illustrating an example optical power-distance profile that may be obtained using the conventional optical link of FIG. 8B. Since there is no forward Raman amplification and no forward OPA, the logarithm of the optical power declines approximately linearly between distances D0 and D2. The power profile 901 is typical of a fiber composition of D+ fiber between D0 and D1 and between D2 and D3, and D− fiber between D1 and D2. In addition, the maximum optical power $P_{H2}$ of the prior power profile 901 is much higher than the maximum optical power $P_{H1}$ needed in the case of the power profile 902 when both forward and backward Raman amplification are employed each with their own OPA. The maximum optical power $P_{H2}$ is much higher than the maximum optical power, $P_{H1}$, of signal power profile 902, and may result in significant non-linear effects that tend to degrade signal quality. The maximum optical power $P_{H1}$ is much lower, and thus does not suffer from as much signal degradation due to non-linear effects. In addition, the higher maximum signal power $P_{H2}$ requires more pump power in the discrete amplifier at D3 due to amplifier pump saturation effects, and thus may not be as efficient. Furthermore, the signal profile 902 has a higher signal-to-noise ratio compared to signal profile 901 which improves the signal quality FIG. 8C illustrates a submarine repeater link 800C that is unconventional. Here, both forward and backward Raman amplification are performed to communicate an optical signal between nodes 801C and 802C, and the residual optical pump power from both the forward and backward Raman amplification are used to power the same OPA 813A. In one embodiment, the on/off gain of the forward Raman amplification is at least 1 dB, whereas the on/off gain of the backward Raman amplification is at least 3 dB. The forward Raman amplification is provided through the fiber 812A by the pump unit 811A of FIG. 8C, which may (but need not) be similar to the pump unit 811A of FIG. 8A. The backward Raman amplification is provided through the fiber 812B by the pump unit 811B of FIG. 8C, which may (but need not) be similar to the pump unit 811B of FIG. 8A. The nodes 801C and 802C may also contain their own discrete amplification of the optical signal. For instance, node 802C is illustrated as containing a discrete amplifier 816C. Although this optical amplification is only shown for one direction (for the eastern optical signal) in FIG. 8C, the same principles may be applied to bi-directional communication as well. One possible advantage of submarine repeater link 800C compared to conventional submarine repeater links is that the distance from node 802C to OPA 813A may be increased with bidirectional optical pumping compared to backward-only optical pumping. Another possible advantage of submarine repeater link 800C is that the residual pump power from the bi-directional pumping (the residual pump power from pump unit 811B may be received at node 801C and the residual pump power from pump unit 811A may be received at node 802C) may be used for node-to-node communication purposes using pump modulation techniques to transmit information. Another possible advantage of submarine repeater link 800C is that the OPA 813A still receives pump power from one of the pump units 811A or 811B in the event of a failure of one of the pump units.

Figure 10:
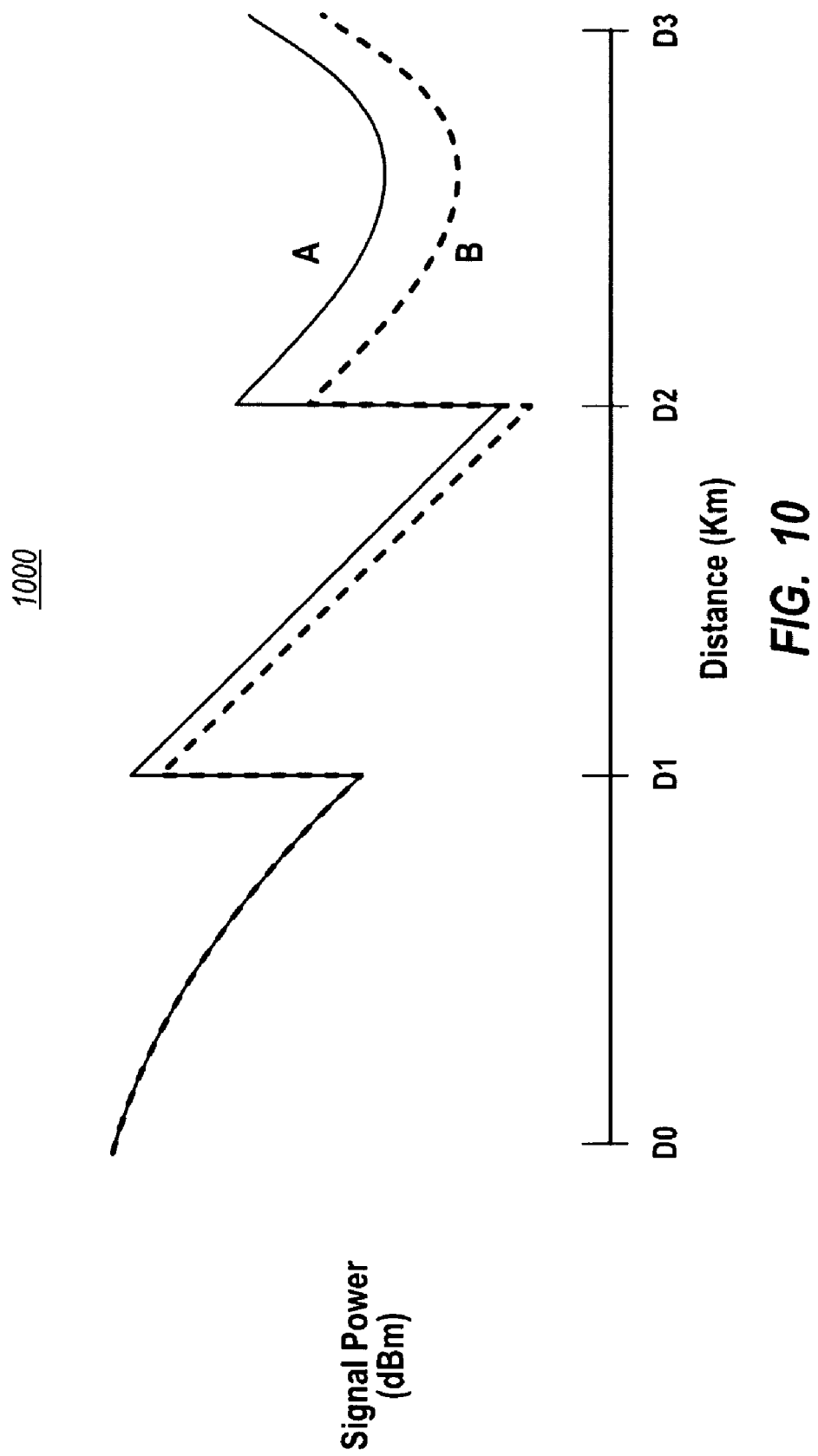
FIG. 10 illustrates optical power profiles comparing the profile of an optical signal in a link that employs pump power cross coupling, as compared to a similar link that does not employ cross coupling.

FIG. 10 illustrates an example power-distance optical profile diagram 1000 that depicts the increased gain that results from one embodiment of the present invention. Profile A represented by the solid line depicts the power-distance profile with optically coupled pumps at locations D1 and D2 as described above with respect to FIGS. 8A and 9. Profile "B" represented by the dashed line depicts the power-distance profile using the same pump power of FIG. 8A, except without optically coupled pumps. The higher signal power at locations D1 and D2 are a result of the increased gain efficiency due to the optically coupled pumps as depicted in FIG. 8A. The optical power profiles of FIG. 10 have been obtained by a simulation. The conditions for the simulation are as follows:

1) The distance from D0 to D1 is 40 kilometers and is an SLA optical fiber ("D+" OFS fiber, Aeff=106 μm², dispersion=20 ps/nm-km @1550 nm),
2) The distance from D1 to D2 is 40 kilometers and is SLA optical fiber ("D+" OFS fiber, Aeff=106 μm², dispersion=20 ps/nm-km @1550 nm),
3) The distance from D2 to D3 is 40 kilometers and is IDF optical fiber ("D−" OFS fiber, Aeff=30 μm², dispersion=−44 ps/nm-km @1550 nm),
4) The forward and backward OPAs are the same (OFS R37014 erbium fiber 5 m),
5) The forward and backwards pumps are the same and are each powered at 172 mW at 1480 nm at the input of the fiber, and
6) The illustrated signal profile is the average of 50 signals. However, these are just the conditions for one specific simulation and should not be construed as limiting the application of the principles described herein in any way.

Accordingly, comparing profile A and profile B in FIG. 10, it can be seen that through the use of a dedicated forward and backward OPA for each eastern and western optical fiber link, and through pump optical power coupling between eastern optical fiber links, optical power is more efficiently used to perform amplification.

Figure 11:
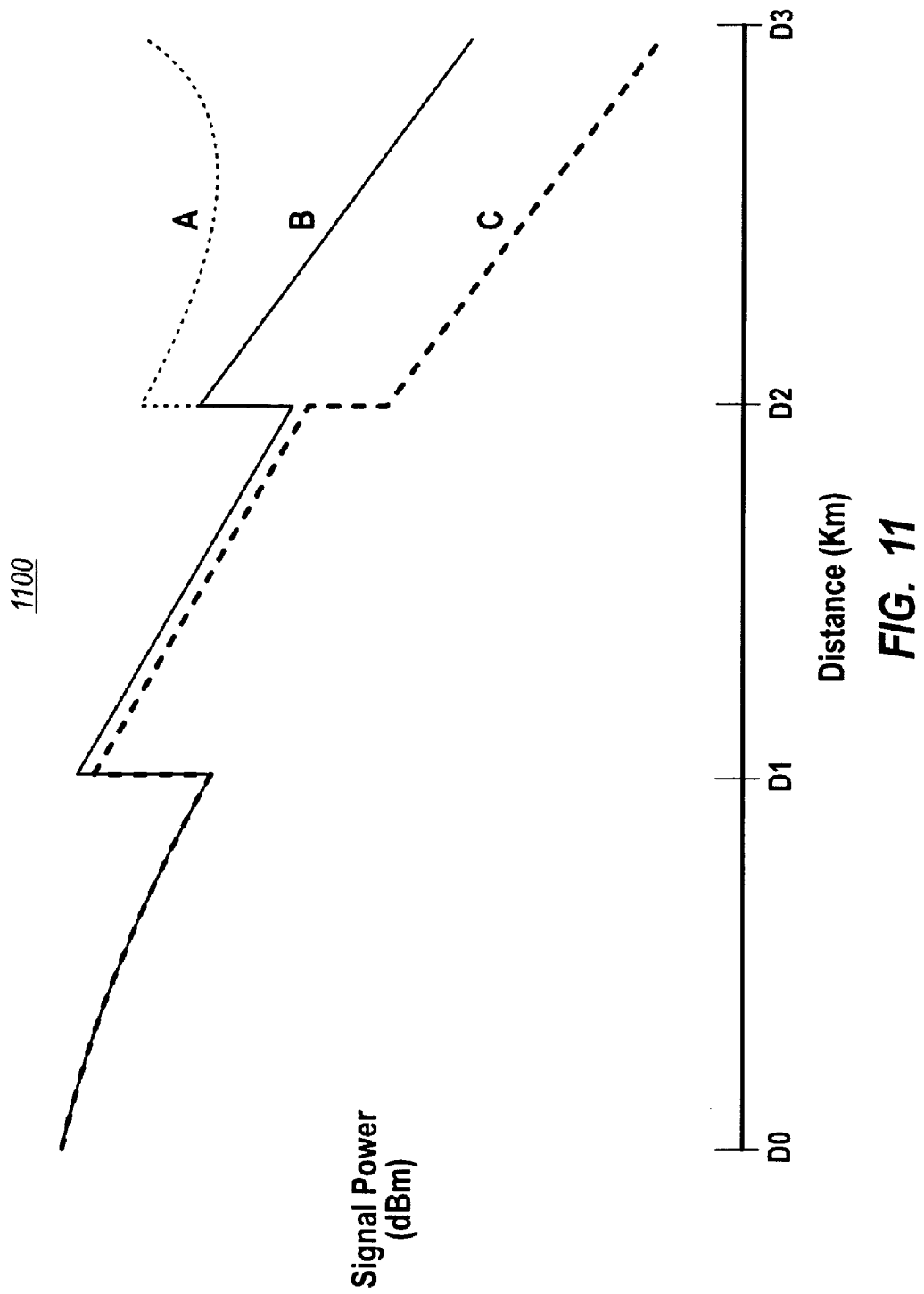
FIG. 11 illustrates optical power profiles that shows performance in the case of a backward Raman pump failure comparing the case where pump power cross coupling is employed, compared to a similar system in which cross coupling is not employed.

Another benefit of the embodiments described herein is the improved robustness of the communication system when one of the Raman pump units fails. For example, in one embodiment the forward OPA 813A and backward OPA 813B of FIG. 8A are rare-earth doped amplifiers. FIG. 11 illustrates example power-distance optical profiles 100 in this embodiment for eastern optical signals of FIG. 8A during normal operation (profile A with optical pump coupling) and for the case where backward pump unit 811B fails. In the failure case, profile C depicts the power-distance profile when optical pump coupling is not employed. In this case the backward OPA 813B of FIG. 8A (being a rare-earth doped amplifier in this embodiment) results in net loss for the signals. This profile C may be compared to profile B which depicts the power-distance profile when optical pump coupling 827A is employed from western forward pump unit 821B of FIG. 8A.

In the case of profile B, the residual pump power obtained through path 827A pumps the backward OPA 813B of FIG. 8A (being a rare-earth doped amplifier in this embodiment) resulting in net gain in the backward OPA 813B. Typically the loss of the backward pump unit 811B of FIG. 8A without optical pump coupling (profile C of FIG. 11) would result in a total loss of optical communications whereas the use of optical pump coupling in this scenario (profile B of FIG. 11) would allow optical communication to continue at a slightly degraded quality level.

Figure 12:
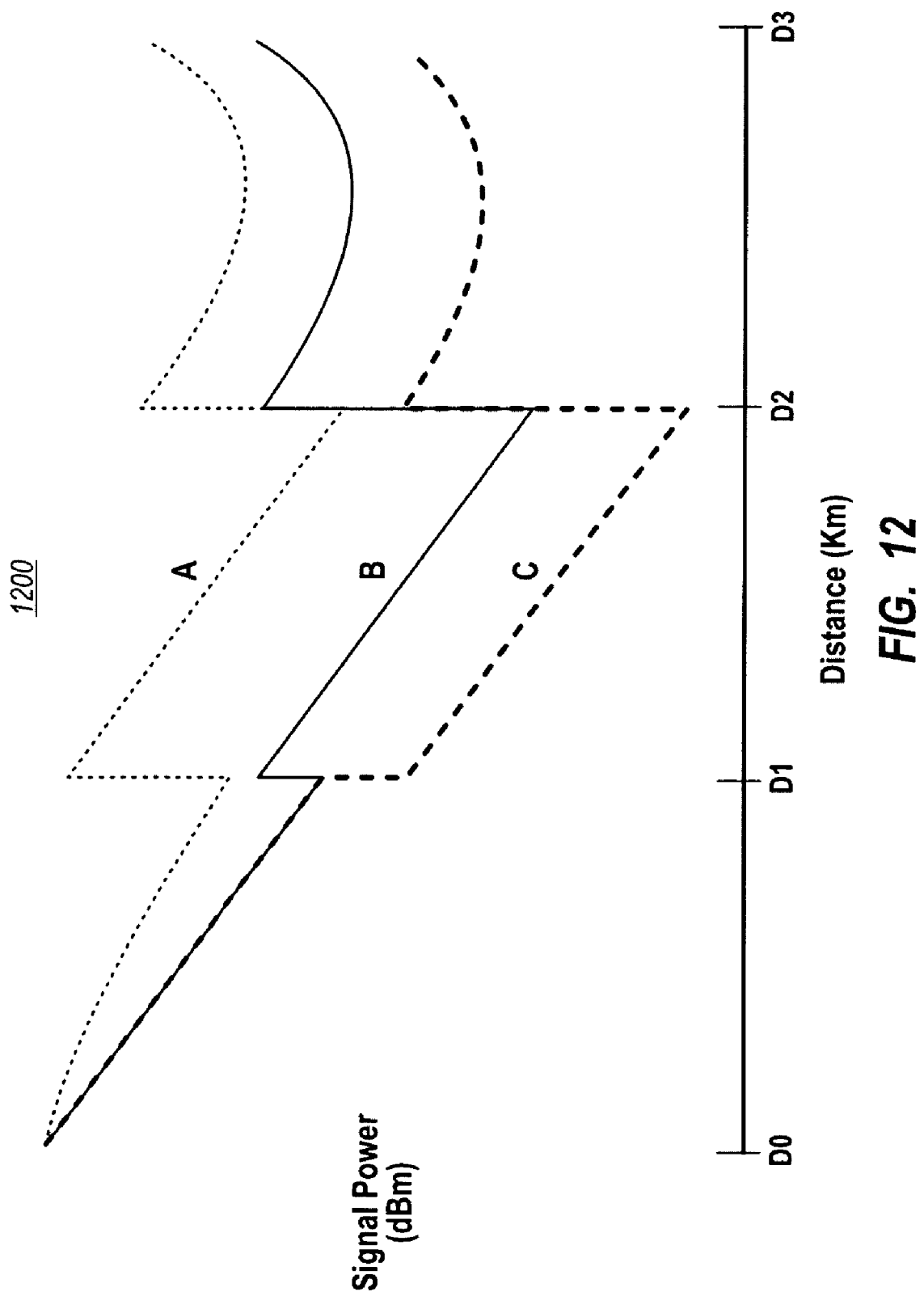
FIG. 12 illustrates optical power profiles that shows performance in the m case of a forward Raman pump failure comparing the case where pump power cross coupling is employed, compared to a similar system in which cross coupling is not employed.

FIG. 12 illustrates example power-distance optical profiles 1200 in the same embodiment of FIG. 11 for eastern optical signals of FIG. 8A during normal operation (profile A with optical pump coupling) and for the case where forward pump unit 811A fails. In the failure case, profile C depicts the power-distance profile when optical pump coupling is not employed. In this case the forward OPA 813A of FIG. 8A (being a rare-earth doped amplifier in this embodiment) results in net loss for the signals. This profile C may be compared to profile B which depicts the power-distance profile when optical pump coupling 827B is employed from western backward pump unit 821A of FIG. 8A. In this case the residual pump power obtained through path 827B pumps the forward OPA 813A of FIG. 8A (being a rare-earth doped amplifier in this embodiment) resulting in net gain in the forward OPA 813A.

It should be noted that in FIGS. 10, 11, and 12 that additional pump power may be used to compensate for the failure scenarios, but less additional pump power would be required using the optical pump sharing and coupling techniques described herein. This advantage reduces the requirements for pump redundancy and may allow only a single pump to provide partial redundancy for both signal directions within one repeater as illustrated by pump unit 401 of FIG. 5. Conventional submarine repeater designs typically require additional redundant pumps (which adds to the cost of the submarine repeater) since any single pump failure would degrade the signal quality too much to maintain data communication.

Accordingly, through the use of a dedicated forward and backward OPA for each eastern and western optical fiber link, and through pump optical power sharing between eastern optical fiber links, optical power is more efficiently used to perform amplification and a more beneficial signal power profile is achieved that may result in reduced detrimental nonlinear effects and higher optical signal quality. Furthermore, pump sharing allows a single pump unit to not only power multiple optical gain stages in one direction, but also one or more optical gain stages in the opposite direction as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A submarine optical link for communication between a first node and a second node in an optical communications system, wherein at least one of the first node or the second node is a submarine optical repeater, the submarine optical link comprising:
    a forward Raman pump at or proximate the first node;
    a forward optically pumped amplifier;
    a first fiber span interconnecting the forward Raman pump to the forward optically pumped amplifier such that the forward Raman pump injects forward optical power into the first fiber span thereby causing forward Raman amplification of an optical signal to occur within the first fiber span, and allowing a portion of a residual amount of the injected forward optical power from the forward Raman pump that remains after the forward Raman amplification to be used to power the forward optically pumped amplifier to further amplify the optical signal, wherein the on/off gain of the forward Raman amplification in the first fiber span is at least 1 dB;
    a backward Raman pump at or proximate the second node;
    a backward optically pumped amplifier; and
    a second fiber span interconnecting the backward Raman pump to the backward optically pumped amplifier such that the backward Raman pump injects backward optical power into the second fiber span thereby causing backward Raman amplification of the optical signal to occur within the second fiber span, and allowing a portion of a residual amount of the injected backward optical power from the backward Raman pump that remains after the backward Raman amplification to be used to power the backward optically pumped amplifier for amplification of the optical signal, wherein the on/off gain of the backward Raman amplification in the second fiber span is at least 5 dB.

2. The submarine optical link in accordance with claim 1, wherein the forward optically pumped amplifier and the backward optically pumped amplifier are separate optically pumped amplifiers.

3. The submarine optical link in accordance with claim 2, wherein at least one of the forward optically pumped amplifier and the backward optically pumped amplifier is a rare-earth doped fiber amplifier.

4. The submarine optical link in accordance with claim 2, wherein at least one of the forward optically pumped amplifier and the backward optically pumped amplifier is an Erbium-doped fiber amplifier.

5. The submarine optical link in accordance with claim 2, further comprising:
    a third fiber span interconnecting the forward optically pumped amplifier and the backward optically pumped amplifier for communicating the optical signal that is amplified by the forward optical pumped amplifier to the backward optically pumped amplifier for amplification by the backward optically pumped amplifier,
    wherein the first fiber span is a fiber having an effective cross-sectional area of greater than 65 $\mu m^2$,
    wherein the third fiber span is a fiber having an effective cross-sectional area of greater than 65 $\mu m^2$, and
    wherein the second fiber span is a fiber having an effective cross-sectional area of less than 65 $\mu m^2$.

6. The submarine optical link in accordance with claim 2, wherein a first optical coupling mechanism is configured to redirect a portion of the injected forward optical power that remains after powering the forward optically pumped amplifier to be used to power a backward optically pumped amplifier in an opposite signal path; and
    a second optical coupling mechanism configured to redirect a portion of the injected backward optical power that remains after powering the backward optically pumped amplifier to be used to power a forward optically pumped amplifier in the opposite signal path.

7. The submarine optical link in accordance with claim 6, wherein the first optical coupling mechanism also redirects a portion of injected backward optical power from the opposite signal path into the forward optically pumped amplifier, and wherein the second optical coupling mechanism also redirects a portion of injected forward optical power from the opposite signal path into the backward optically pumped amplifier.

8. The submarine optical link in accordance with claim 1, wherein an optical signal that travels through the first and second fiber spans has a plurality of wavelength division or dense wavelength division optical signals that are each greater than 1550 nanometers in wavelength; and
wherein at least one of the plurality of wavelength division or dense wavelength division optical signals has a wavelength of greater than 1567 nanometers.

9. The submarine optical link in accordance with claim 8, further comprising:
a tilt control mechanism configured to adjust optical pump power provided for forward and/or backward Raman amplification to thereby adjust gain dependency on wavelength.

10. The submarine optical link in accordance with claim 1, wherein an optical signal that travels through the first and second fiber spans has a plurality of wavelength division or dense wavelength division optical signals, at least one of which having a wavelength of greater than 1567 nanometers.

11. The submarine optical link in accordance with claim 1, wherein the first node is a submarine optical repeater and comprises an optical power source that emits optical power, and an optical power distribution mechanism that distributes the emitted optical power for use in the forward Raman amplification in the submarine optical link, backward Raman amplification in a neighboring submarine optical link, and discrete amplification in the submarine optical repeater, all in the same signal direction.

12. The submarine optical link in accordance with claim 11, wherein the optical power distribution mechanism is configured to distribute the emitted optical power in a manner that the frequency characteristics of the emitted optical power are preserved.

13. A submarine optical repeater in accordance with claim 11, wherein the optical power source comprises a distributed feedback laser.

14. The submarine optical link in accordance with claim 11, wherein the discrete amplification in the submarine optical repeater is performed using an Erbium-doped fiber amplifier and the emitted optical power is in the range of 1400 to 1525 nanometers in wavelength.

15. The submarine optical link in accordance with claim 14, wherein the optical power distribution mechanism allows at least part of the emitted optical power to be used in optically powering one or more gain stages in an opposite signal path.

16. The submarine optical link in accordance with claim 14, wherein the optical power distribution mechanism comprises a redundant optical pump that provides at least partial pump redundancy for all optical pumps in both signal directions.

17. The submarine optical link in accordance with claim 14, wherein the emitted optical power is within 20 nanometers in wavelength of 1480 nanometers.

18. The submarine optical link in accordance with claim 14, wherein a total optical pump power of the emitted optical power for one signal direction is less than 600 milliWatts.

19. The submarine optical link in accordance with claim 1, wherein the total length of the optical path in the submarine optical link is 90 kilometers or greater.

20. A submarine optical link for communication between a first node and a second node in an optical communications system, wherein at least one of the first node and the second node is a submarine optical repeater, the submarine optical link comprising:
a forward Raman pump at or proximate the first node;
an optically pumped amplifier;
a first fiber span interconnecting the forward Raman pump to the optically pumped amplifier such that the forward Raman pump injects forward optical power into the first fiber span thereby causing forward Raman amplification to occur within the first fiber span, and allowing a residual amount of the injected forward optical power from the forward Raman pump that remains after the forward Raman amplification to be used to power the forward optically pumped amplifier; and
a backward Raman pump at or proximate the second node; and
a second fiber span interconnecting the backward Raman pump to the optically pumped amplifier such that the backward Raman pump injects backward optical power into the second fiber span thereby causing backward Raman amplification to occur within the second fiber span, and allowing a residual amount of the injected backward optical power from the backward Raman pump that remains after the backward Raman amplification to be used to also power the optically pumped amplifier.

21. The submarine optical link of claim 20, wherein on/off gain of the forward Raman amplification in the first fiber span is at least 1 dB, and the on/off gain of the forward Raman amplification in the first fiber span is at least 3 dB.

22. The submarine optical link in accordance with claim 20,
wherein the first node comprises a data modulation module configured to modulate data on the injected forward optical power, and
wherein the second node further comprises a data de-modulation module configured to retrieve the modulated data from the portion of the injected forward optical power that reaches the second node.

23. The submarine optical link in accordance with claim 20,
wherein the second node comprises a data modulation module configured to modulate data on the injected backward optical power, and
wherein the first node further comprises a data de-modulation module configured to retrieve the modulated data from the portion of the injected backward optical power that reaches the first node.

* * * * *